(12) United States Patent
Kruzick et al.

(10) Patent No.: US 11,625,148 B2
(45) Date of Patent: Apr. 11, 2023

(54) INTELLIGENT SNAP ASSIST RECOMMENDATION MODEL

(71) Applicant: MICROSOFT TECHNOLOGY LICENSING, LLC, Redmond, WA (US)

(72) Inventors: Amy Elizabeth Kruzick, Seattle, WA (US); Peter Joseph Kreiseder, Redmond, WA (US); Kenneth Martin Tubbs, Issaquah, WA (US); Stacy Carson, Redmond, WA (US); Upasna Suman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/234,739

(22) Filed: Apr. 19, 2021

(65) Prior Publication Data

US 2022/0334685 A1  Oct. 20, 2022

(51) Int. Cl.
*G06F 3/0482* (2013.01)
*G06F 9/451* (2018.01)
*G06N 20/00* (2019.01)

(52) U.S. Cl.
CPC ............ *G06F 3/0482* (2013.01); *G06F 9/451* (2018.02); *G06N 20/00* (2019.01)

(58) Field of Classification Search
CPC .... G06F 3/0482; G06F 9/451; G06F 3/04845; G06N 20/00
See application file for complete search history.

(56) References Cited

U.S. PATENT DOCUMENTS

| 9,910,884 B2 | 3/2018 | Churchill et al. |
| 10,949,432 B1 | 3/2021 | Grayson |

(Continued)

FOREIGN PATENT DOCUMENTS

| CN | 110333818 A | 10/2019 |
| EP | 3951578 A1 | 2/2022 |

OTHER PUBLICATIONS

"Non Final Office Action Issued in U.S. Appl. No. 17/234,750", dated Dec. 24, 2021, 17 Pages.

(Continued)

*Primary Examiner* — Beau D Spratt
*Assistant Examiner* — Qi Wan
(74) *Attorney, Agent, or Firm* — Newport IP, LLC; Jacob P. Rohwer

(57) ABSTRACT

The techniques disclosed herein enable systems to provide intelligent snap assist recommendations using a diverse set of factors and factor weights. To generate recommendations, a system receives a user input placing a first item in a region of a snapped configuration in a display environment. In response, the system assigns a confidence score for a plurality of items including items open in the display environment as well as items that are not open. The system then ranks the items based on confidence score and selects a list of recommended items from the ranked list. The recommended items are then presented in a second region of the snapped configuration for selection. The system is further configured to receive and analyze user selections of snapped items to learn over time and adjust confidence scoring.

20 Claims, 13 Drawing Sheets

(56) References Cited

U.S. PATENT DOCUMENTS

| | | | |
|---|---|---|---|
| 2011/0093333 A1* | 4/2011 | Hjelm | G06Q 30/02 |
| | | | 705/14.49 |
| 2013/0073985 A1 | 3/2013 | Hamlin et al. | |
| 2014/0108190 A1* | 4/2014 | Kang | G06Q 30/0631 |
| | | | 705/26.7 |
| 2015/0199085 A1* | 7/2015 | Churchill | G06F 3/04817 |
| | | | 715/739 |
| 2015/0347532 A1* | 12/2015 | Shaw | G06F 3/0484 |
| | | | 707/722 |
| 2016/0062552 A1 | 3/2016 | Jeong et al. | |
| 2017/0053169 A1* | 2/2017 | Cuban | G06V 20/13 |
| 2017/0083963 A1 | 3/2017 | Agarwal | |
| 2017/0228444 A1 | 8/2017 | Shaw et al. | |
| 2018/0321843 A1* | 11/2018 | Giannotti | G06F 3/04845 |
| 2019/0220438 A1* | 7/2019 | Pal | G06F 9/453 |
| 2021/0097122 A1 | 4/2021 | Ahlstrom et al. | |
| 2021/0181929 A1 | 6/2021 | Pan et al. | |
| 2021/0278932 A1 | 9/2021 | Sos-munoz et al. | |
| 2021/0286510 A1 | 9/2021 | Tyler et al. | |
| 2022/0334686 A1 | 10/2022 | Kruzick et al. | |

OTHER PUBLICATIONS

"International Search Report and Written Opinion Issued in PCT Application No. PCT/US22/022706", dated Jul. 25, 2022, 14 Pages.

"International Search Report and Written Opinion Issued in PCT Application No. PCT/US22/022970", dated Jul. 6, 2022, 13 Pages.

Roe, Dianaa., "How to Split Screen on Windows 10 and View Apps Side by Side", Retrieved From: https://www.digitalcitizen.life/ultimate-guide-snapping-windows-side-side-windows-10/, Mar. 30, 2020, 11 Pages.

"Final Office Action Issued in U.S. Appl. No. 17/234,750", dated May 12, 2022, 23 Pages.

U.S. Appl. No. 17/234,750, filed Apr. 19, 2021.

"Non Final Office Action Issued in U.S. Appl. No. 17/234,750", dated Dec. 23, 2022, 27 Pages.

\* cited by examiner

INTELLIGENT SNAP ASSIST RECOMMENDATION MODEL

BACKGROUND

As working remotely gains popularity, personal computing devices such as laptops, tablets, and desktop computers have become the primary workspace for more and more users. Providing an efficient and intuitive user experience is an important aspect for software platforms and operating systems that power personal computing devices. In many scenarios, a software platform can include a desktop environment provided by an operating system displaying a plurality of items such as applications, files, media content, and the like.

To streamline the use of personal computing devices, the software platform may provide multitasking features to allow users to easily organize items in a desktop environment. For instance, one multitasking feature provides a side-by-side grid in which items are positioned and resized. A user can initiate a "snap" operation by placing an item into a position on one side of a display screen and subsequently select an additional item to snap into another position on the other side of the display screen. This can be accomplished using a snap assist menu which presents users with available items for snapping in response to the user input initiating the snap operation.

Unfortunately, typical snap assist solutions only present items which are already open in the desktop environment, thereby limiting snapping options available to the user. In addition, existing snap assist solutions merely presents available items with no organization or underlying logic dictating how or which items are displayed. For example, items presented in the snap assist menu may not be relevant to the user's current task causing the user to forgo utilizing the snap assist feature resulting in a degraded user experience and reduced productivity. In another example, the user may wish to snap an application, a file, or a website that is not currently open in the desktop environment. Since existing snap assist solutions are limited to currently open items, the user must spend an extended amount of time and resources to manually find and open desired items, further degrading the user experience.

It is with respect to these and other considerations that the disclosure made herein is presented.

SUMMARY

The disclosed techniques improve the efficiency and functionality of software platforms that provide snap assist multitasking features. Generally described, a system utilizes a machine learning model to analyze a plurality of factors to provide recommendations in a snap assist user interface (UI) in response to a user input initiating a snap operation. Snapping items enables a user to organize items in a desktop environment and streamline productivity.

In various examples, the desktop environment may be provided by a personal computing device such as a laptop, a tablet, a foldable computing device, a desktop computer, and the like. In addition, the disclosed techniques can be utilized in environments other than desktop environments, such as a mobile device, a large format display in a conference room, or other display environments. Items displayed in one of these types of environments can include applications, files, websites, activities, etc. Snapping items can involve a user initiating a snapping operation by placing a displayed item into a first position of an organized grid. In response, the system can present the user with a snap assist menu displaying available items that can be snapped into additional positions of the organized grid.

As discussed above, existing snap assist solutions only present items that are currently open and displayed in the display environment. However, items that are currently displayed in the display environment may not be relevant to the user's current task thus defeating the purpose of snap assist features. In another example, a user may wish to snap items that are not currently open. Therefore, this user must manually locate and open the items they wish to snap in association with a first snapped item. Thus, there is a need for software platforms that provide snap assist multitasking features to provide more meaningful recommendations to streamline the user experience and enhance productivity.

In various examples, a machine learning model can be trained using a diverse set of system signals, app signals, and/or historical user data to provide meaningful snap assist recommendations. This set of signals and data may also be referred to herein as factors. By providing snap assist recommendations that are useful to a user, the system can streamline the user experience and improve productivity. Further, the system can adapt over time to suit habits, tasks, and past actions of a particular user. Consequently, snap assist recommendations can improve over time and be tailored to individual users. In addition, recommended items displayed in the snap assist UI can be shown in a visual hierarchy by prominently displaying items that are most likely to be useful. By directing a user's attention to items that are most useful, the user experience is further streamlined and enhanced.

In contrast to existing solutions, the training of a machine learning model using various factors enables intelligent snap recommendations. Previously, snap recommendations consisted merely of currently open items and were presented without any organization or underlying intelligence. As such, existing snap assist solutions make it difficult for a user to find a desired item, thereby extending the time required for a user to set up their workspace. As will be discussed in more detail below, the intelligent snap recommendations provided can include items that are not currently open or displayed in a display environment, but that are deemed relevant to the user's current task. By streamlining the process of snapping items through useful and meaningful snap recommendations, users can reach a maximally productive state more quickly and efficiently.

To provide snap assist recommendations, the system can receive a user input initiating a snap operation to resize and/or position a first item in a first position of an organized grid. In response, the system can determine confidence scores for a set of items based on the set of factors discussed above. The system can rank the items in the set according to the confidence scores and select items that have confidence scores that satisfy a threshold. In one example, the system can determine items that have confidence scores that exceed a threshold confidence score to recommend to the user. In another example, items can be selected based on a position of an item in the ranked list being in one of the top N positions, where N is a threshold number of top ranked items. In a specific example, a ranked list may contain ten items and only the top five (e.g., N=5) items are selected for recommendation to the user. In various examples, threshold N can be a predefined number of top ranked items and configured by a system engineer or other administrative entity. The threshold N can also be adjusted over time to suit various users or contexts.

Furthermore, the system can adjust various thresholds to provide an intuitive user experience. For instance, the system may initially select recommended items that have a confidence score that exceeds a threshold confidence score. In some situations, however, the number of recommended items with a sufficiently high confidence score may fall below a threshold number of items (e.g., only one item is eligible for recommendation). In response, the system can decrease the threshold confidence score and reevaluate the candidate items for recommendation. In this way, the system can generate alternative sets of recommended items to ensure that many options are available to the user.

The factors can include those regarding a particular item such as frequency of use, recency of use, a preexisting position in the display environment, snap frequency, etc. The factors can also include relationships between an item and the first item that was snapped such as a frequency with which an item is grouped with the first item, a level of relation between an item and the first item (e.g., similar title, similar category or type of item, etc.), and a preexisting position in the display environment in relation to the first item. In addition, weights can be applied to the factors to emphasize or deemphasize individual factors. The value of the weights can be determined and/or adjusted (e.g., learned) over time based on historical user data, such as past user snap selections. This determination and adjustment can be based on snap selections indicating tendencies and/or patterns of the general population (e.g., a large number of users that use the snap assist tool) or can be based on snap selections indicating tendencies and/or patterns of individual users.

In addition, a display engine can receive a ranked list of recommended items from the machine learning model and generate an intuitive and/or customized recommendation layout to present the items to the user. For instance, the display engine can generate recommendation layouts to display snap recommendations in the visual hierarchy discussed above to draw the user's attention to highly ranked items. In a specific example, the recommendation layout can include a first region displaying first items in an enlarged format near the top of the display device and a second region displaying additional items in a format that is smaller and below the first items. The display engine can additionally generate recommendation layouts based on the size of the ranked list, in order to improve the user's access and review of the recommended items. For example, the recommendation layout can include a scrollable menu to enable a user to view additional items of the ranked list.

Furthermore, the display engine can receive user inputs selecting an item from the snap assist UI and adjust future layout generation based on the user input. For instance, if the user selects a highly ranked item that was prominently displayed in the layout, the display engine can detect the user input and continue to generate layouts accordingly. Conversely, if the user selects a lower ranked item that was not prominently displayed, the display engine can adjust future layouts and customize the presentation of recommendations over time based on user activity. In a specific example, the display engine may adjust the various weights to refine future confidence scores and ranked lists.

As discussed above, and further described herein, by employing a machine learning model to provide intelligent snap recommendations, the disclosed system can enable users to organize various types of display environments (e.g., a desktop environment) more efficiently and effectively. This is enabled by calculating confidence scores using a wide variety of factors and providing a ranked list of recommended items. The factors help provide a clear picture of a user's intent and allow the machine learning model to provide recommendations that are more likely to be useful for an individual user. In existing solutions without intelligent snap recommendations, users may need to manually locate and open desired items thus degrading the user experience and unnecessarily consuming computing and network resources. By providing intelligent snap recommendations, users can more quickly and efficiently organize a display environment and reach a maximally productive state thereby conserving computing resources and improving performance.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
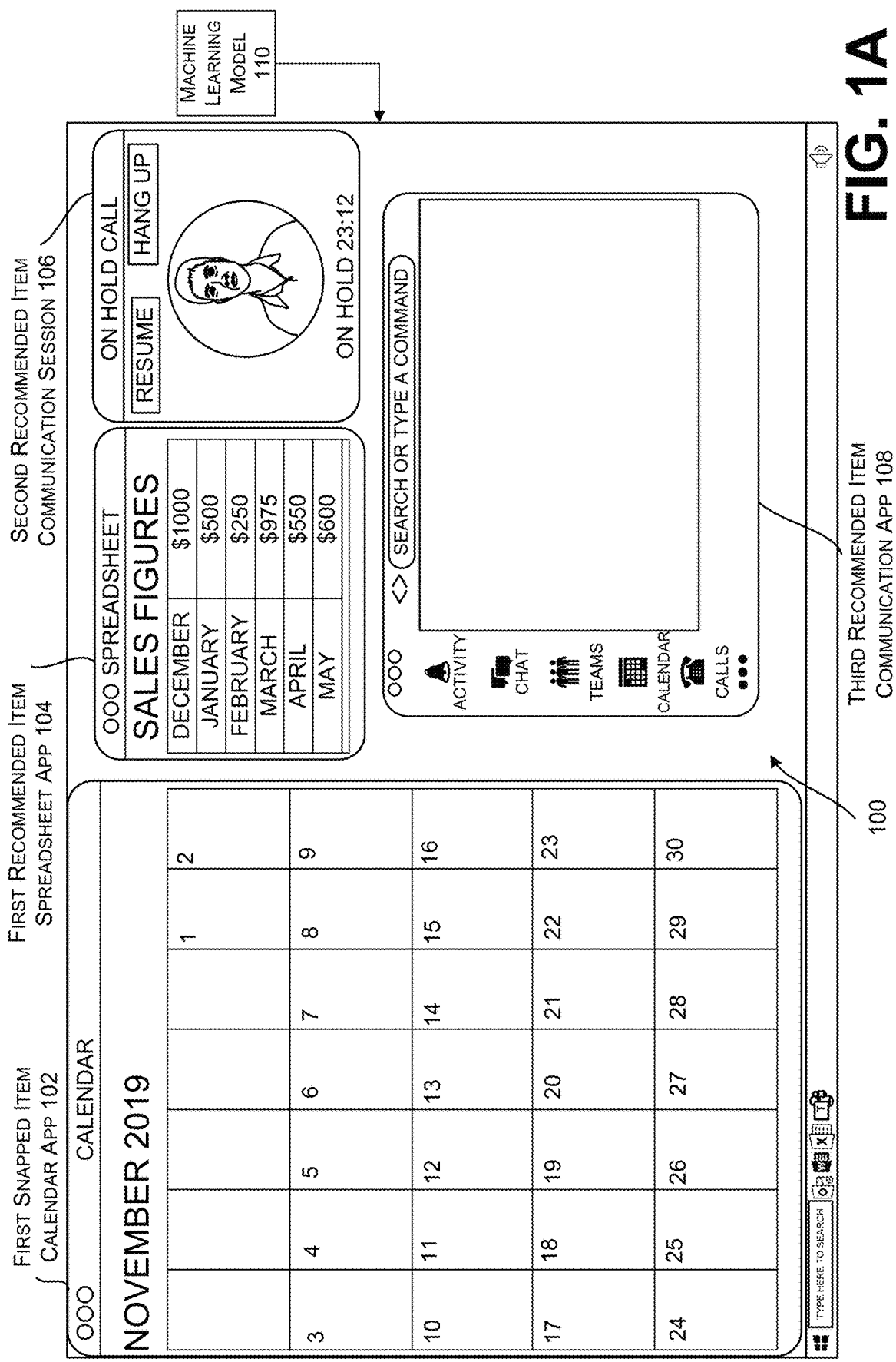
FIG. 1A illustrates an environment with a snap assist multitasking feature utilizing intelligent snap recommendations to present several recommended items.

The techniques described herein provide systems for optimizing the use of computing resources and to improve the operation of snap assist multitasking features in display environments by the introduction of a machine learning model using various factors to intelligently recommend items for snapping. The factors can include application signals, system signals, historical user data, and/or other data that defines past activity or habits that influence a likelihood of a user snapping a particular item. A recommended item can include an application, a file, a website, an operating system menu, a contact or other digital content that includes an associated graphical representation displayed in the environment. For instance, these graphical representations may generally be referred to as user interface elements or windows. In addition, items can be freely moved about the environment and presented in a separated or overlapping (e.g., stacked) manner.

The disclosed techniques address several technical problems associated with snap assist recommendation generation and presentation. For example, the disclosed system addresses inefficiencies and limitations with existing snap assist solutions that do not provide intelligent snap assist recommendations. This often leads to a degraded user experience resulting in reduced productivity. As described in more detail below, the disclosed techniques can also improve the performance of various personal computing devices. By providing intelligent snap assist recommendations, the disclosed techniques can conserve computing resources, such as processing cycles, memory resources, and networking resources through a streamlined the user experience.

Traditional approaches to snap assist solutions are limited in several ways. Firstly, only items that are currently open and displayed in the environment are eligible for display in the snap assist user interface (UI). Consequently, if a user wishes to snap an item that is not currently open, the user must manually locate and open the desired item. Secondly, existing snap assist UIs merely present the items currently opened with no further organization or underlying intelligence. These limitations often lead to reduced productivity and a degraded user experience.

In contrast, the disclosed techniques provide intelligent snap assist recommendations that are generated by a machine learning model based on a diverse set of factors. Generating snap recommendations in this manner ensures that recommended items are relevant to a user's task at hand enabling the user to quickly organize a display environment and reach a maximally productive state. In addition, by utilizing a machine learning model and various factor weightings, the snap recommendations described herein can improve over time and lead to a personalized experience for individual users. The disclosed techniques further streamline the user experience by providing layouts that intuitively present the snap assist recommendations in a visual hierarchy that draws the user's attention to highly ranked items.

In another example of the technical effect of the present disclosure, the intelligent snap assist recommendations described herein improve the performance of personal computing devices. This is possible due to the ability of the snap recommendations to improve over time utilizing user input to refine and customize the generation and display of recommended items. By tailoring the user experience to individual users, the disclosed system can enable a user to organize a display environment even quicker as the system adapts to specific habits and contexts. Thus, by continually receiving user input and improving the user experience, the system can improve performance by conserving various computing resources.

Various examples, scenarios, and aspects that enable intelligent snap assist recommendation generation and presentation are described below with reference to FIGS. 1-11.

FIG. 1A illustrates a display environment (e.g., display screen) 100 in which a calendar application 102 is a first item snapped on the left side of the display screen to occupy a first region of the display environment as a result of a user input. The display environment can encompass a display device that is part of a personal computing device such as a laptop, a tablet, a desktop computer, and the like. Additionally, the display environment can be a display device that is part of a shared device (e.g., a conference room or "hub" device, a kiosk, etc.). In various examples, the user input that triggers the snapping of the calendar application 102 can be a gesture dragging the calendar application 102 to the edge of the display environment. The gesture can be performed using a pointing device such as a mouse and executing a dragging motion to the edge of the display environment. Alternatively, the user input can be performed on a touch sensitive display using a finger or a stylus and similarly performing a dragging motion to the edge of the display environment.

In response to the user input performing the snapping gesture, the system can display several recommended items in a second region of the display environment, such as a spreadsheet application 104, an active communication session 106, and a communication application 108. These recommended items 104, 106, 108 enable the user to select and snap a particular item alongside the calendar application 102. In this example, and as discussed above, each of the recommended items have an associated confidence score that is calculated based on various factors such as frequency of use, recency of use, and the like. As will be described in further detail below, the recommended items 104, 106, 108 are part of a ranked list of recommended items generated by a machine learning model 110 and are selected for presentation in the display environment 100 based on the confidence scores. It should be understood that the machine learning model 110 can be implemented in any way. In some examples, the machine learning model 110 is implemented as part of a personal computing device that provides the display environment 100. Alternatively, the machine learning model 110 may be implemented in a remote and/or network-based server environment in communication with the personal computing device.

In a specific example, the system can detect that the first snapped item is the calendar application 102. Accordingly, the system can determine that the user frequently utilizes the spreadsheet application 104 at the same time as the calendar application 102 to perform data entry tasks and is likely to snap the calendar application 102 and spreadsheet application 104 together. Consequently, the system can assign the spreadsheet application 104 a high confidence score and include the spreadsheet application 104 among the recommended items. In another example, the system can detect that the user is currently involved in a communication session 106. In this instance, the communication session may have recently been displayed in the foreground of the display environment. Thus, the system can determine that the communication session 106 is likely to require additional attention from the user. Consequently, the system can assign the communication session 106 a high confidence score and present the communication session 106 as a recommended item to the user. In a similar manner, the system can determine that the user typically uses the calendar application 102 and the communication application 108 in tandem to schedule meetings. As with the spreadsheet application 104, the system can assign a high confidence score to the communication application 108 and recommend the communication application 108 to the user.

Figure 1B:
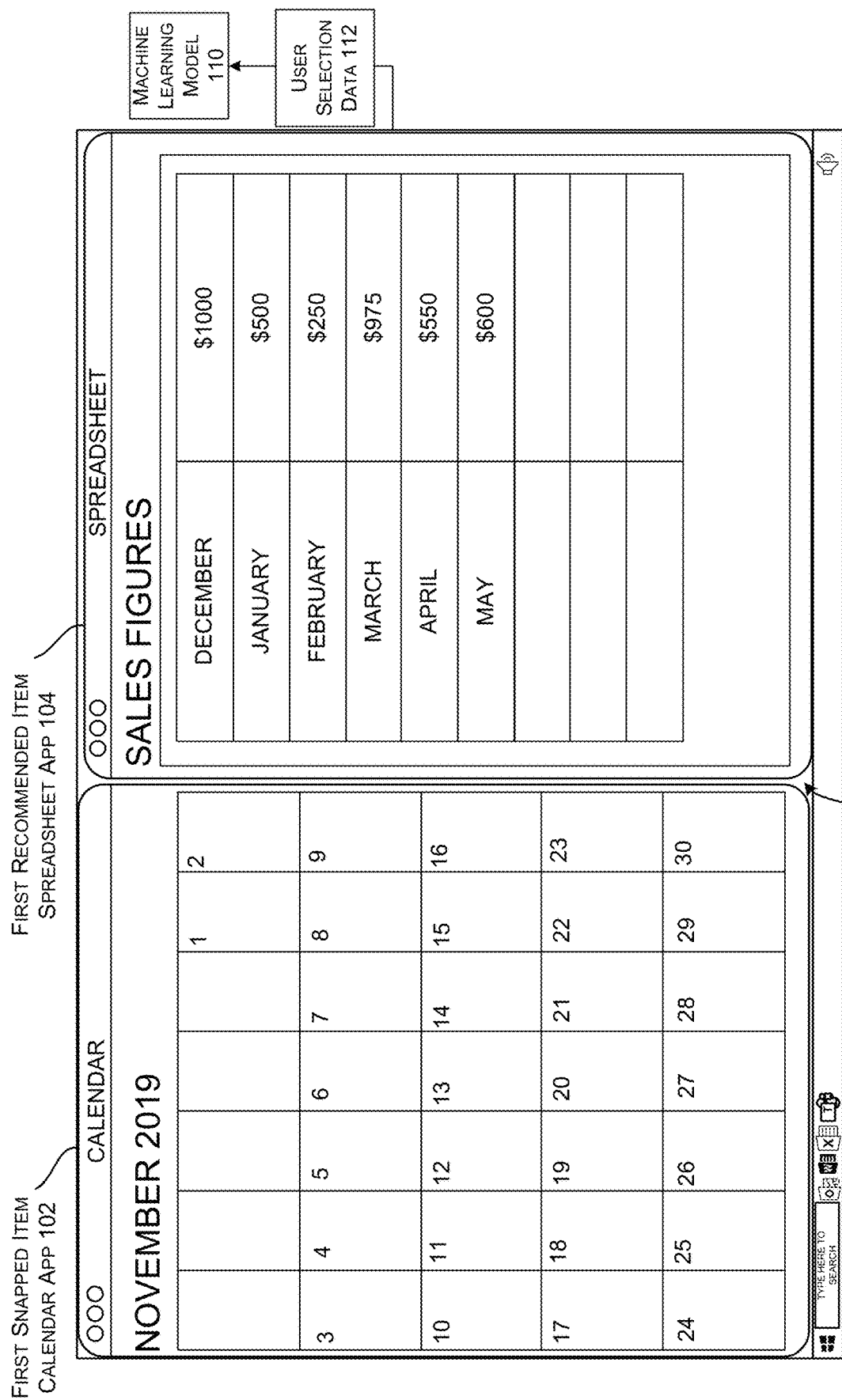
FIG. 1B illustrates an environment displaying a snapped configuration following a user selection of a recommended item to snap alongside a first item.

Turning to FIG. 1B, a user has subsequently selected the spreadsheet application 104 to snap alongside the calendar application 102. Accordingly, the system has enlarged the spreadsheet application 104 to fill the second region of the display environment. A number of regions (e.g., two, three, four), as well as a size and a position of each of the regions to which the items are snapped into, may be preconfigured as an organized layout, or grid. In addition, the machine learning model 110 can receive and store user selection data 112 defining the user's choice of the spreadsheet application 104. As discussed above, and in further detail below, the machine learning model 110 can analyze the user selection data 112 to inform future snap assist recommendations and tailor the user experience to specific habits and contexts of individual users. In various examples, the machine learning model 110 can be initially trained using user data from many users (e.g., the global userbase) and reflect large-scale habits among a general user population. Furthermore, an individual instance of the machine learning model 110 can be associated with a particular user or user device and gradually adapt to the particular habits to provide a tailored experience.

It should be understood that while the illustrated example of FIG. 1B depicts snapping items in an organized grid within a single display device, the snap assist interface can utilize multiple display devices. For instance, in a multi-display configuration, a first item can be snapped to fill a first region in a first display device and a second item can be snapped to fill a second region in a second display device. In addition, while the illustrated example of FIG. 1B shows a side-by-side format, the arrangement and number of items in an organized layout can be automatically configured by the system or modified by the user to create a custom preferred grid. For instance, a user may snap items in a default layout such as the two-item arrangement shown in FIG. 1B where both items are shown in a similar size. The user can subsequently adjust the boundaries of the grid to increase the size of calendar application 102 and reduce the size of spreadsheet application 104. Additionally, the user can indicate a preferred grid format to snap items using custom boundaries, numbers of items, and so forth.

Figure 2:
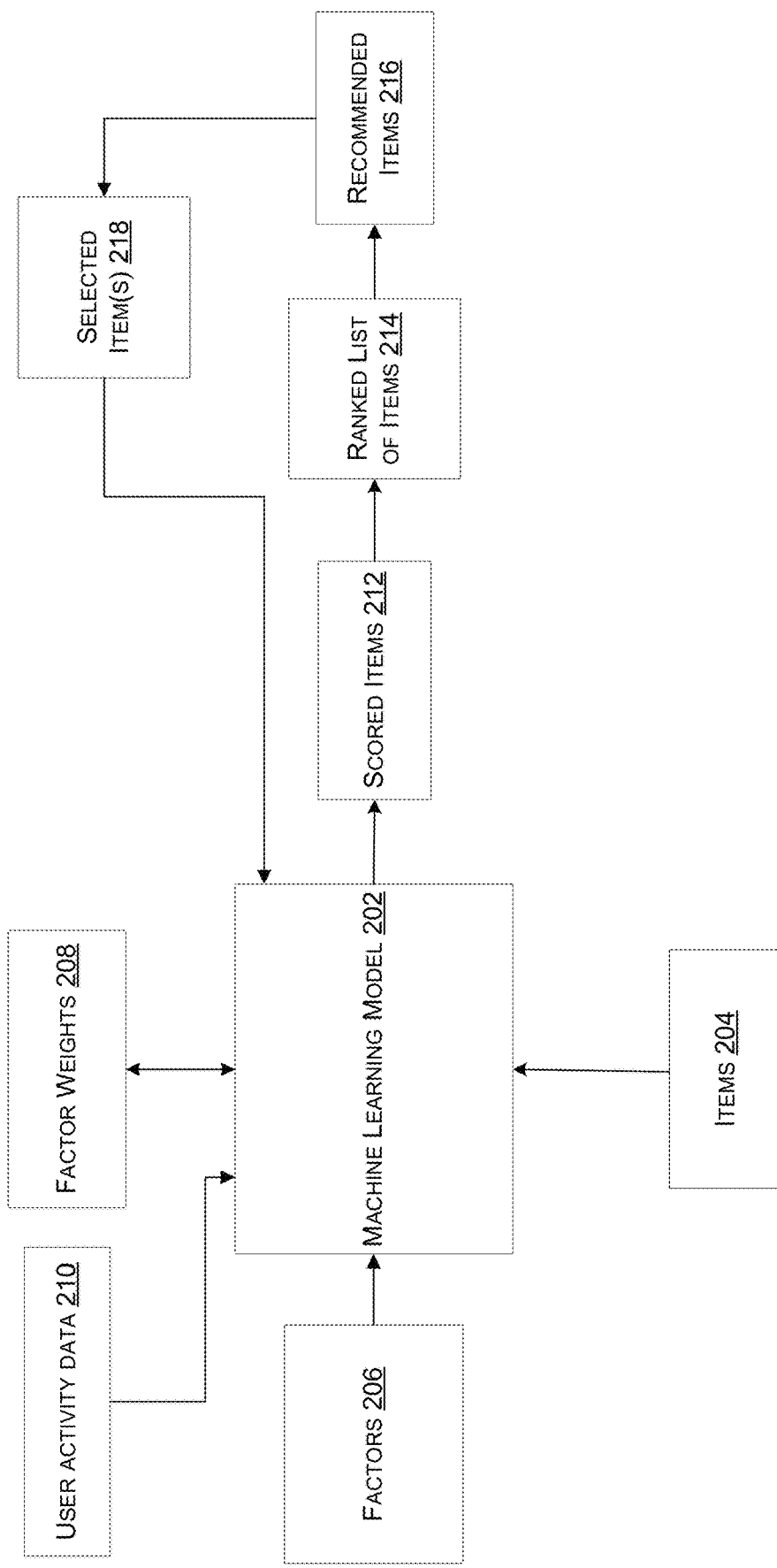
FIG. 2 is a block diagram illustrating aspects of a machine learning approach that calculates confidence scores using various factors and factor weights.

Turning now to FIG. 2, the machine learning model 202 (e.g., machine learning model 110) that enables the generation of intelligent snap assist recommendations will be explained. To generate snap assist recommendations, the machine learning model 202 receives a plurality of items 204. As discussed above, an item can be a standalone application, a file, a website, a contact, an activity within an application and so forth. In contrast to existing solutions, the items provided to the machine learning model 202 are not limited to items that are open and currently displayed.

In addition, the machine learning model 202 receives a set of factors 206 to calculate confidence scores for each item 204. The factors 206 can include a wide variety of data and signals retrieved from various items, data stores, and the operating system that provides the display environment. As described above, the factors can include various characteristics of an item such as frequency of use, recency of use, a position in the display environment, a download location and the like. The factors can additionally include relationships and associations between an item and the first snapped item such as a factor indicating that an item is frequently used at the same time as the first item as discussed in the examples of FIG. 1A. Other examples can include a factor indicating that an item belongs to a similar category as the first item (e.g., productivity applications, media applications, etc.), a factor relating items with similar titles or keywords, a factor indicating that an item is frequently snapped with the first item and so forth.

Furthermore, the machine learning model 202 can receive a set of factor weights 208 that serve to emphasize or deemphasize individual factors. The weights 208 can be predetermined values that serve to favor certain factors over others. For instance, the factor indicating that an item is frequently snapped alongside the first item may be more heavily weighted as compared to the factor relating similar titles or keywords. The factor weights 208 can also be adjusted by the machine learning model 202 using user activity data 210 which defines various activity such as certain habits in application use, different contexts in which the snap assist UI is invoked (e.g., productivity, leisure, entertainment) and so forth. As discussed above, the user activity data 210 can be an aggregate of multiple users' habits such as within a household, an organization, or globally to allow the machine learning model to adapt to large scale trends in snap assist use. Alternatively, the user activity data 210 may define activity for a single user enabling the machine learning model 202 to tailor the snap assist features to suit the single user and provide a customized experience.

After receiving the items 204, factors 206, factor weights 208, and user activity data 210, the machine learning model 202 can calculate a confidence score for each of the items and generate a set of scored items 212. The system can then sort the scored items to generate a ranked list of items 214. As will be described in more detail below, the system can then select a set of recommended items 216 from the ranked list of items to present to the user in the snap assist UI. Since the ranked list of items 214 may contain a large number of items, presenting the entire list may be impractical. In these cases, the system can select the most highly ranked items to be displayed. As discussed above, the system can select recommended items 216 using a threshold confidence score or a threshold number of items and adjust the various thresholds. As described, the system can decrease the threshold confidence score when the number of recommended items 216 falls below a threshold number of items.

The system can subsequently receive a user input selecting an item from the recommended items 216 to snap alongside the first item such as the calendar application 102 shown in FIG. 1A. In addition, the machine learning model 202 can receive data defining the selected items 218 to inform future item scoring. For instance, the machine learning model 202 can use the selected items 218 to adjust the factor weights 208 and update subsequent sets of scored items 212. In this way, the selected item(s) become a form of the user activity data 210 and the system can continually improve over time to consistently recommend items that are useful and relevant to a user's task at hand.

Figure 3A:
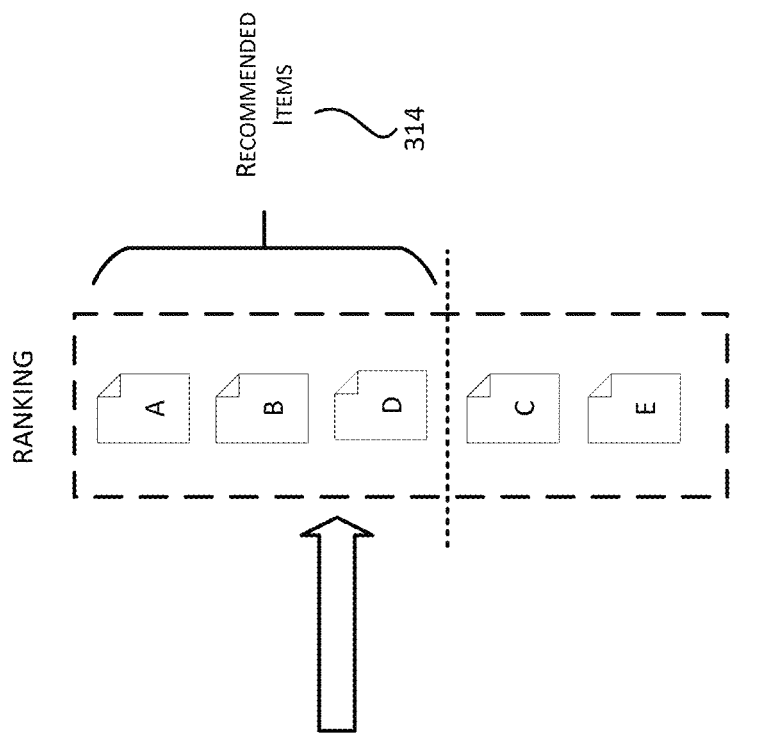
FIG. 3A is a sample data set that shows confidence scores generated by the system for ranking and recommending items based on the operations shown in FIG. 2.

Turning now to FIG. 3A, an example of confidence score calculation and item ranking is illustrated. The example discussed in FIG. 3A is based on the examples illustrated in FIGS. 1A and 1B as well as the operations describe din FIG. 2. In this example, a set of items 302 and a set of factors 304A-304F are shown in a table 306. In addition, the confidence scores 308 are calculated according to a set of parameters 310. In this instance, the factors are given equal weight, individual factor scores are generated and summed to generate a final score, and the threshold score used to select items to recommend is set to twenty.

Based on the parameters 310, the factor scores 304A-304F for items A-E are listed in the table 306. In the table 306, the factor scores 304, based on the factors 206, for each of the items A-E is determined based on analysis of the items 204 performed by the machine learning model 202. For example, the machine learning model 202 can include a method for quantizing the various factors of the items 204 into the corresponding factor scores 304. Then a total score 312, also known as the confidence score 308, for each item can be generated using the individual factor scores 304.

Since the parameters 310 indicate that equal weight is applied to the factor scores 304, the total score 312 can be determined to be a sum of the factor scores 304 for the corresponding items. The total score 312 for each item is then compared with the threshold score of twenty. Items that have a total score 312 that is higher than the threshold score will be determined to be recommended items 314 and displayed to the user in the snap assist UI as shown in FIG. 1A. According to one aspect of the implementation, the items are ranked according to their confidence scores 308 before applying the threshold score of 20. In this way, the recommended items is also a ranked list in which the item that is determined by the machine learning model as the most likely to be snapped is ranked at the top of the list.

In the example illustrated in FIG. 3A, the confidence scores 308 are calculated based on a use frequency score 304A and a use recency score 304B indicating a user's level of interaction with a particular item. The factors also include a Z-order score 304D which indicates whether an item is near the foreground of the display environment. Finally, the factors include a grouping score 304C, a snap frequency score 304E, and a configuration score 304F that may individually or collectively indicate a level of association between an item 302A-302E and the first snapped item. It should be understood that the factors 206 considered in the calculation of confidence scores 308 can include many more factors than those illustrated in FIG. 3A. For instance, the system can consider the creation date of an item (e.g., older items may generally be less relevant than new items), a status of the item (e.g., whether the item is currently open), an origination location of the item such as where the item was downloaded from of where the item is stored, or an item type or category (e.g., productivity, entertainment, etc.). The system can even consider hardware parameters of the computing device that presents the display environment such as display screen resolution, screen orientation (e.g., portrait mode or landscape mode), and the number of screens.

In the example shown in FIG. 3A, item A is the most highly ranked of the items due to a high use frequency score 304A and use recency score 304B indicating that item A is frequently used by the user as well as very recently used leading to an increased likelihood of snapping. Item A also has a high grouping score 304C indicating that item A is frequently utilized consecutively or concurrently with the first item in a task flow but not necessarily used in a snapped configuration. For example, the communication application 108 shown in FIG. 1A may have a high grouping score since it is frequently used concurrently with the calendar application 102 to look up and schedule meetings. In addition, item A has a high snap frequency score 304E indicating that the user frequently snaps item A in the display environment, regardless of position in a snapped configuration. Similarly, item B has high marks in use frequency 304A, use recency 304B, and snap frequency 304E. In addition, item B has a high Z-order score indicating that item B was recently displayed in the foreground of the display environment (e.g., stacked above other items in the display environment). For instance, the active communication session 106 shown in FIG. 1A may have a high Z-order score since the user was recently interacting with the window in the foreground.

Item D is the final recommended item due largely to a high configuration score indicating that item D is typically displayed in a certain configuration and/or position alongside the snapped item. For example, in FIG. 1A, the system can detect that when a user snaps the calendar application 102 on the left side of the display environment, he or she typically snaps the spreadsheet application 104 on the right side. Based on these past snapping configurations, the system can accordingly assign the spreadsheet application 104 a high configuration score.

Figure 3B:
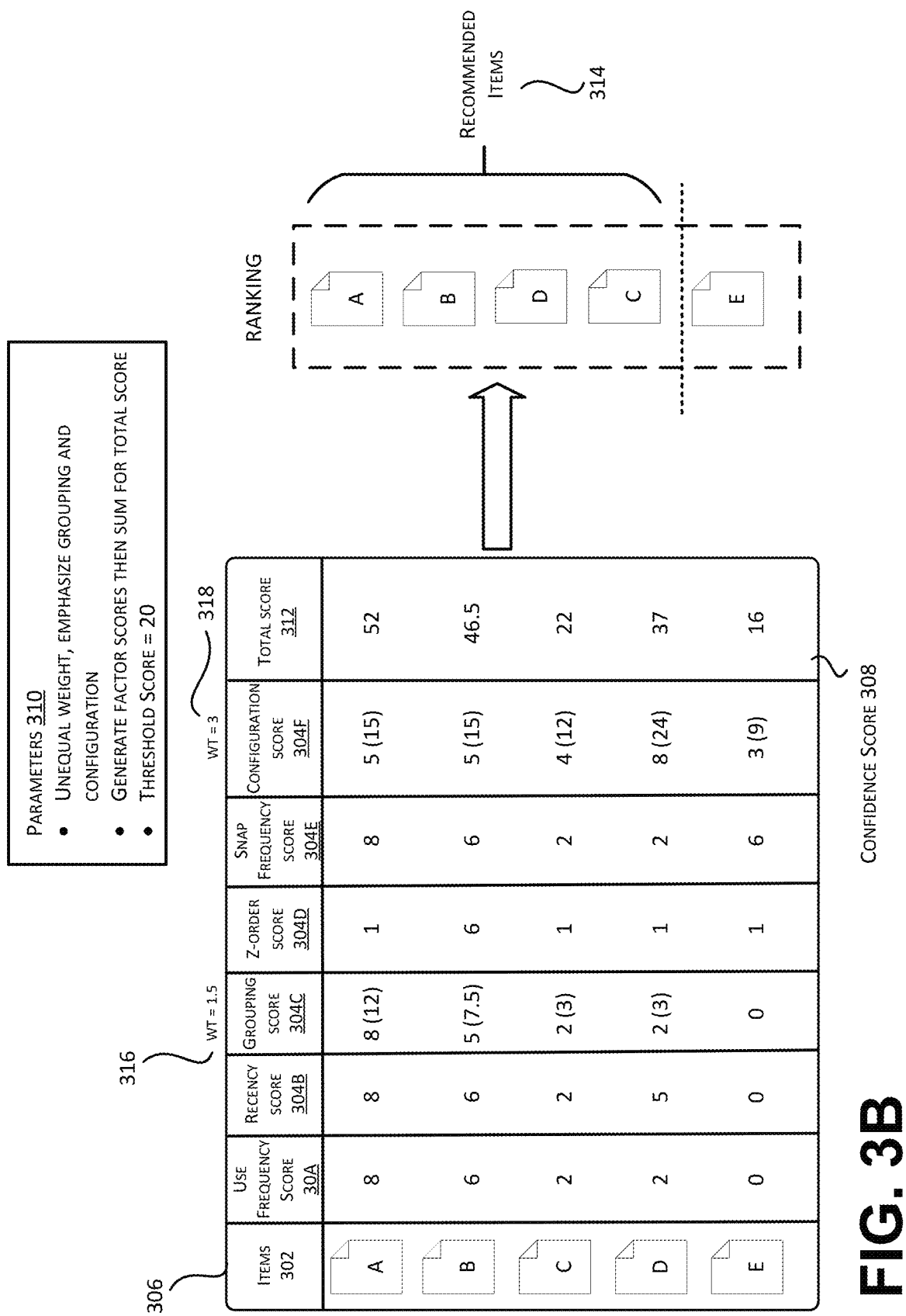
FIG. 3B is another sample data set that shows confidence scores generated by the system for ranking and recommending items based on the operations shown in FIG. 2.

In the example shown in FIG. 3B, the threshold confidence score defined by the parameters 310 remains twenty, however, item C is now among the recommended items. This is due to the addition of factor weightings 316 and 318 which correspond to the factor weights 208 shown in FIG. 2. In this instance, the grouping score 304C and configuration score 304F are heavily weighted indicating an emphasis by the system on relationships between items and the first snapped item. Item C, having a moderate level of relation to the first snapped item as indicated by the configuration score 304F, benefits from the heavy weighting of the configuration score and is therefore eligible for inclusion among the recommended items. The weightings can be generated based on analysis by the machine learning model 202 of user activity data 210 and selected items 218. As discussed, the weightings can be adjusted by the machine learning model over time to adapt to user habits to refine the generation of recommended items and tailor the user experience.

It should be understood that examples shown in FIGS. 3A and 3B are merely illustrative and should not be construed as limiting. Various sets of factors 206, weighting schemes and/or mechanisms for scoring items 212 can be utilized to determine a ranked list of items 214 and the recommended items 314 according to the preference of an individual or an entity that defines the parameters 310. For example, if the individual or entity setting the parameters values the relationships between items and the first snapped item, then the grouping score 304C and the configuration score 304F should be considered and be assigned a higher weight if a weighted score is to be calculated.

Figure 4:
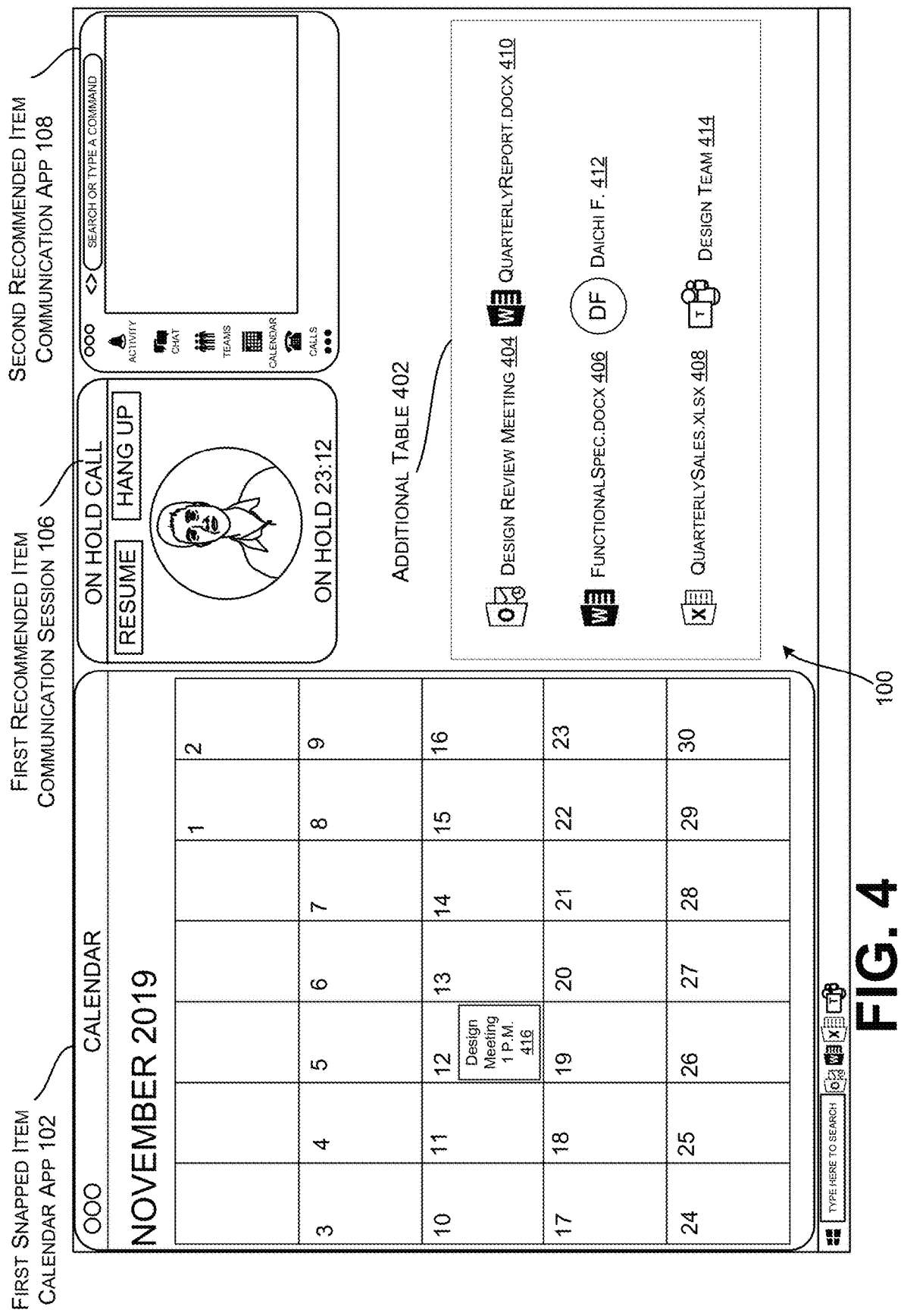
FIG. 4 illustrates additional aspects of an environment with a snap assist multitasking feature utilizing intelligent snap recommendations.

Turning now to FIG. 4, additional aspects of a system for generating and displaying recommended items will be shown and discussed. In this example, a display environment 100 such as the one shown in FIG. 1A is shown once again with a calendar application 102 snapped in a first region on the left side of the display environment. Accordingly, a snap assist UI is displayed in a second region on the right side of the display environment. In similar fashion to the environment of FIG. 1A, active communication session 106 and communications application 108 are displayed as recommended items due to a high confidence score calculated by the machine learning model 202 as described in FIG. 2-FIG. 3B. In FIG. 4 however, an additional table 402 displays several additional recommended items to the user. As discussed above, and in contrast to existing snap assist solutions, the machine learning model 202 can recommend additional items that are not currently open or displayed in the display environment but may have a high confidence score. In this example, these items can include application activities such as the Design Review Meeting 404, files such as the Functional Spec 406, the Quarterly Sales 408, and the Quarterly Report 410, contacts such as Daichi F. 412, and Design Team 414, as well as websites and other items.

By expanding the diversity of items that can be presented in the snap assist UI to include files, activities, contacts, and the like, the system can provide more specific and likely useful recommendations. In addition, including items that are not currently open on the display environment further streamlines the user experience by providing the user with shortcuts to relevant items allowing the user quickly to set up their preferred workspace. As a result, these enhancements to the snap assist UI enable a user to reach a maximally productive state in less time compared to existing snap assist solutions thereby improving performance to personal computing devices.

In accordance with aspects of the system as discussed above, the additional recommended items 404-414 are part of the ranked list of items along with the active communication session 106 and the communications application 108. In addition, the additional items 404-414 are selected for presentation in the snap assist UI based on an associated confidence score. For example, upon detecting that the user has snapped calendar application 102, the system can determine that the user frequently utilizes the calendar application 102 as part of a task flow for scheduling and attending meetings. Thus, the system may recommend the communications application 108 to the user as it is also part of the meetings task flow. More specifically however, the system may also detect that the user is part of an upcoming design review meeting 416, as specified in the calendar application 102. Accordingly, the system can recommend items that may be relevant to the specific meeting such as the design review meeting 404, the functional spec 406, and the design team 414. Furthermore, it should be understood that the recommended items shown in FIG. 4 are items of the ranked list that have an associated confidence score that meets or exceeds a threshold confidence score as shown in the examples of FIGS. 3A and 3B. The ranked list of items may contain many more items than those that are recommended to the user and the recommended set may be modified by adjusting the threshold score, factor weightings, and so forth.

In addition, while the example illustrated in FIG. 4 presents recommended items in order of confidence score (e.g., communication session 106 has the highest score, design team 414 has the lowest score), the system may use the factors 206 to organize the recommended items in the snap assist UI. For instance, the recommended communication session 106 and communication application 108 items may be currently open and displayed in the display environment. Conversely, items 404-414 may not be currently open but received high confidence scores and are thus recommended to the user. To communicate the distinction between a currently open item and a closed item to the user, the system can group closed items within the additional table 402.

Figure 5:
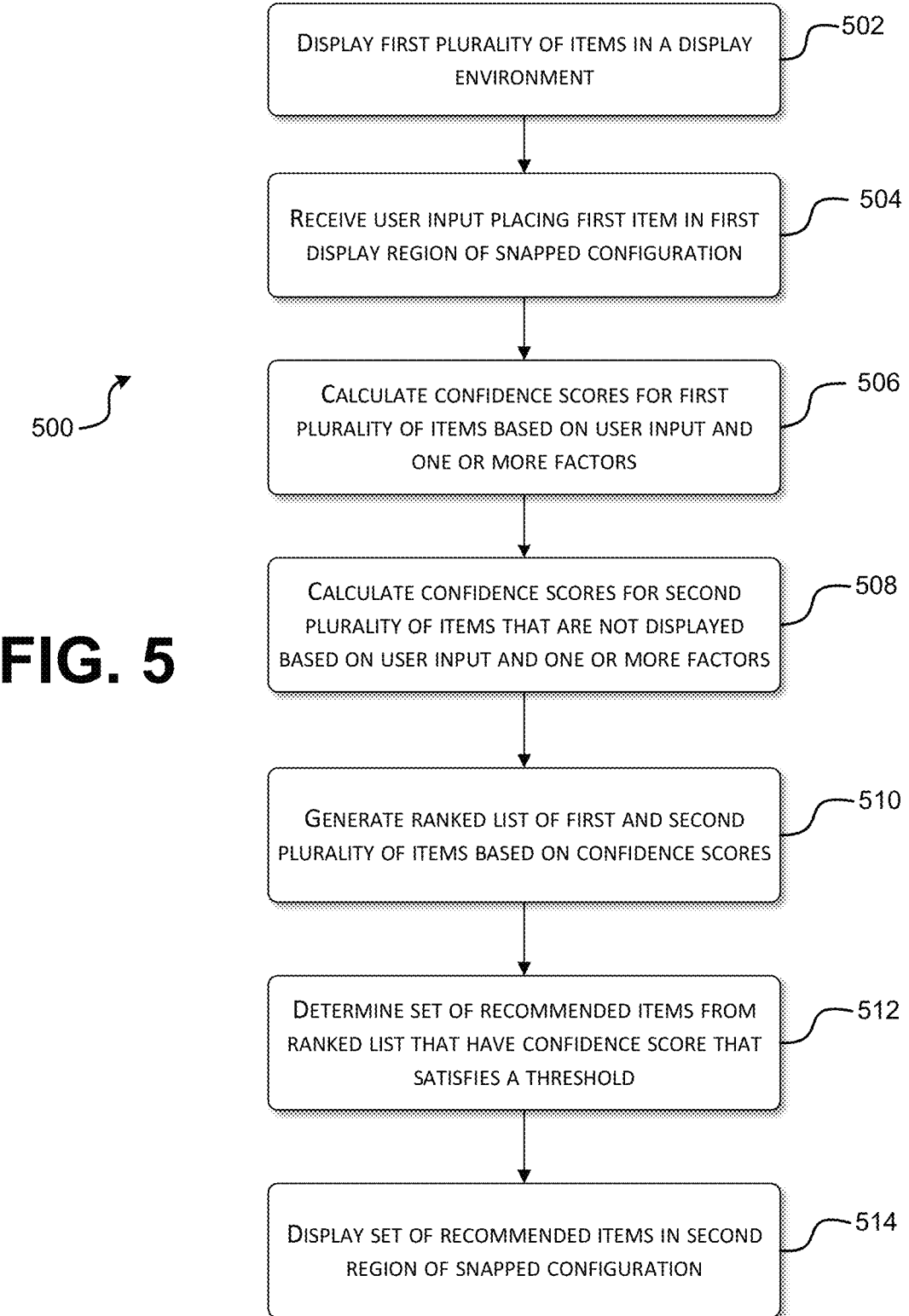
FIG. 5 is a flow diagram showing aspects of a routine for enabling the techniques disclosed herein.

Turning now to FIG. 5, aspects of a routine 500 for generating intelligent snap assist recommendations are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 502 where a display environment displays a first plurality of items. As described above, the items can include application activities, files, contacts, websites and the like.

Proceeding to operation 504, a user can provide input placing a first item of the first plurality of items in a snapped configuration such as the calendar application 102 shown in FIG. 1A. As discussed above, the user input can be a gesture dragging the first item to the edge of the display environment. The gesture can be performed using a pointing device such as a mouse and executing a dragging motion to the edge of the display environment. Alternatively, the user input can be performed on a touch sensitive display using a finger or a stylus and similarly performing a dragging motion to the edge of the display environment.

At operation 506, the system responds to the user input of operation 504 by calculating confidence scores 308 for the first plurality of items 204 (e.g., items that were already present in the display environment). The confidence scores can be based on the user input and one or more factors 206 such as a recency of use, an item position in the display environment, a level of association with the first item and so forth.

Subsequently at operation 508, the system calculates confidence scores 308 for a second plurality of items 204 (e.g., items that are not currently open in the display environment). As with the first plurality of items, the confidence scores are based on the user input and the one or more factors 206.

Proceeding to operation 510, the system can generate a ranked list of items 214 based on the confidence scores 308. The ranked list of items can include items from both the first plurality of items and the second plurality of items.

At operation 512, the system can select a set of recommended items 216 from the ranked list of items 214. The recommended items can have a confidence score that satisfies a threshold. In various examples, the threshold can be a threshold confidence score where items having an associated confidence score that meets or exceeds the threshold are recommended. In another example, the threshold can be a number of items. For instance, if the threshold number items is five, the top five items from the ranked list are selected for recommendation.

Finally, at operation 514, the recommended items 216 are displayed in a second region of the snapped configuration such as the example shown in FIG. 1A and FIG. 4. Items displayed among the recommended items can be part of the first plurality of items (e.g., items currently open in the display environment) or part of the second plurality of items (e.g., items that are not open).

Figure 6:
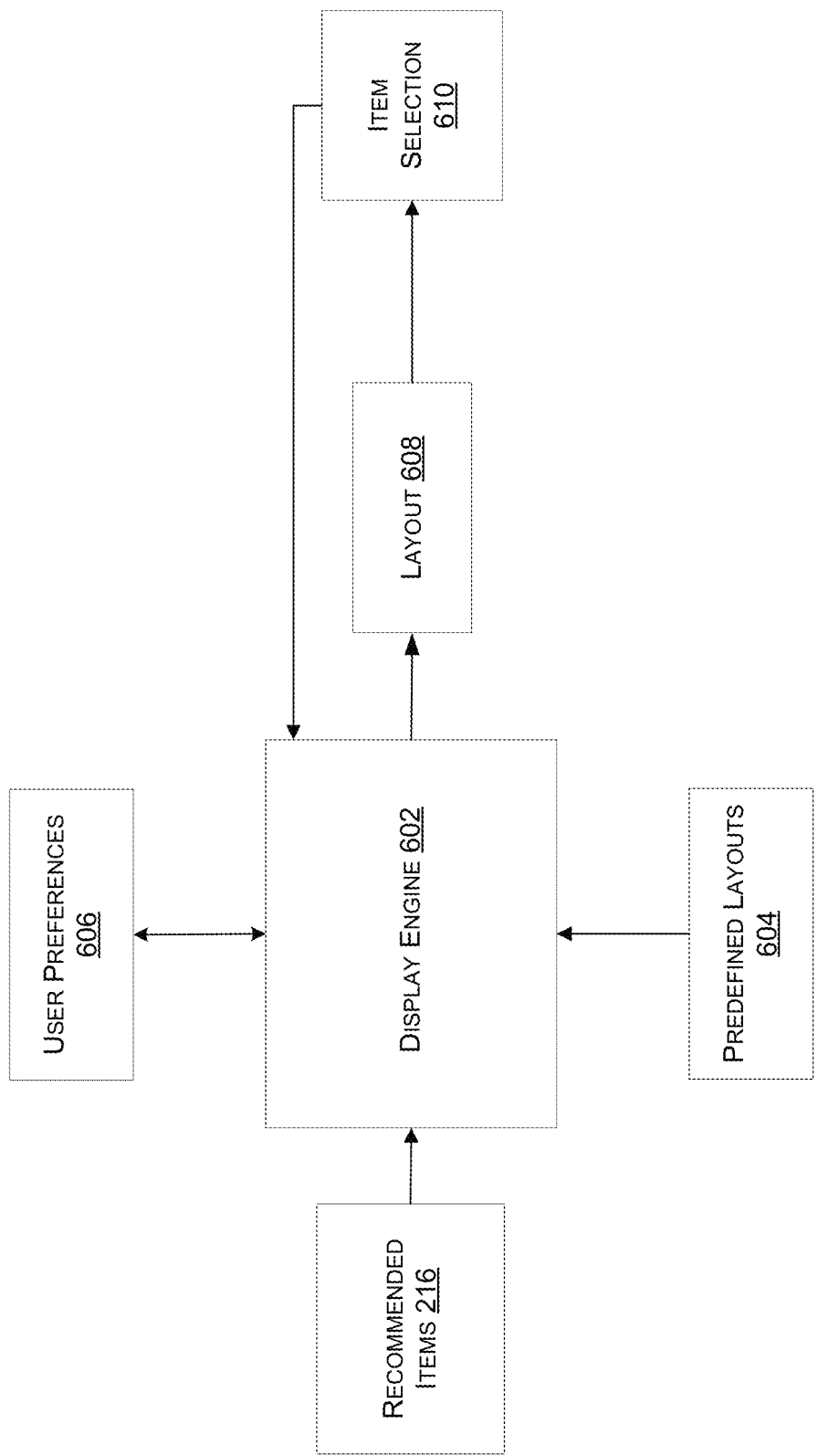
FIG. 6 is a block diagram illustrating functions of a layout engine that generates recommendation layouts for displaying recommended items.

Turning now to FIG. 6, aspects of a display engine 602 that enables intuitive presentation of intelligent snap assist recommendations will be explained. To display snap assist recommendations, the display engine 602 receives the set of recommended items 216 generated by the machine learning model 202 shown in FIG. 2. In addition, the display engine 602 receives a set of predefined recommendation layouts 604 to organize and present the recommended items. As described above, the layouts can present items in a visual hierarchy that prominently displays items having a high position within the set of recommended items 216. In this way, a user's attention can be drawn to items that are more likely to be snapped thus further streamlining the user experience. In various examples, and as will be described in more detail below, these default layouts 604 can include various ways of presenting recommended items such as organizing items into multiple regions within a layout, sorting items into multiple pages, or utilizing a scrollable menu to present many recommended items. In addition, the display engine 602 receives a set of user preferences 606 defining various parameters relevant to individual users such as preferences for certain layout formats over others, data defining past item selections and the like. It should be understood that prominently displaying items is not limited to the size or position of items within snap assist UI. For example, a prominent display can include highlighting certain items for emphasis.

Using the recommended items 216, the set of default layouts 604, and the user preferences 606, the display engine 602 can generate a layout 608 to intuitively present the recommended items 216 in the snap assist UI. The display engine 602 can generate layouts based a variety of factors. For instance, the selection of a certain layout 608 can be based on the size of the list of recommended items 216. In a specific example, if the list of recommended items contains a large number of items, the display engine 602 can select a multi-page layout to present the items in an intuitive and organized fashion. In another example, the selection of a layout can be based on the requirements of the visual hierarchy. Consider a list of recommended items 216 in which many items have a high confidence score translating a prominent display within the visual hierarchy. In this case, the display engine 602 may select a scrollable layout to present all of the recommended items.

From the layout 608, the user can then select an item to snap alongside the first snapped item. Data defining the item selection 610 can be subsequently received by the display engine 602 to refine future generated layouts 608. As will be elaborated below, the user may select an item that was prominently displayed within the visual hierarchy indicating that he or she agrees with the ranking of items and the display engine's presentation. In this case, the display engine 602 can continue generating layouts with minimal changes. Alternatively, the user may select an item having a lower ranking and thus a less prominent position within the visual hierarchy. Accordingly, the display engine 602 can adjust future layouts 608 to account for the user's feedback. In a specific example, the display engine 602 can adjust factor weights 208 to adjust future confidence scores. By reflecting the ranking of recommended items in a visual hierarchy, the system can direct users to items that they are most likely to snap. Thus, the user experience is further streamlined, and the time required for individual users to set up a productive workspace is reduced.

Figure 7:
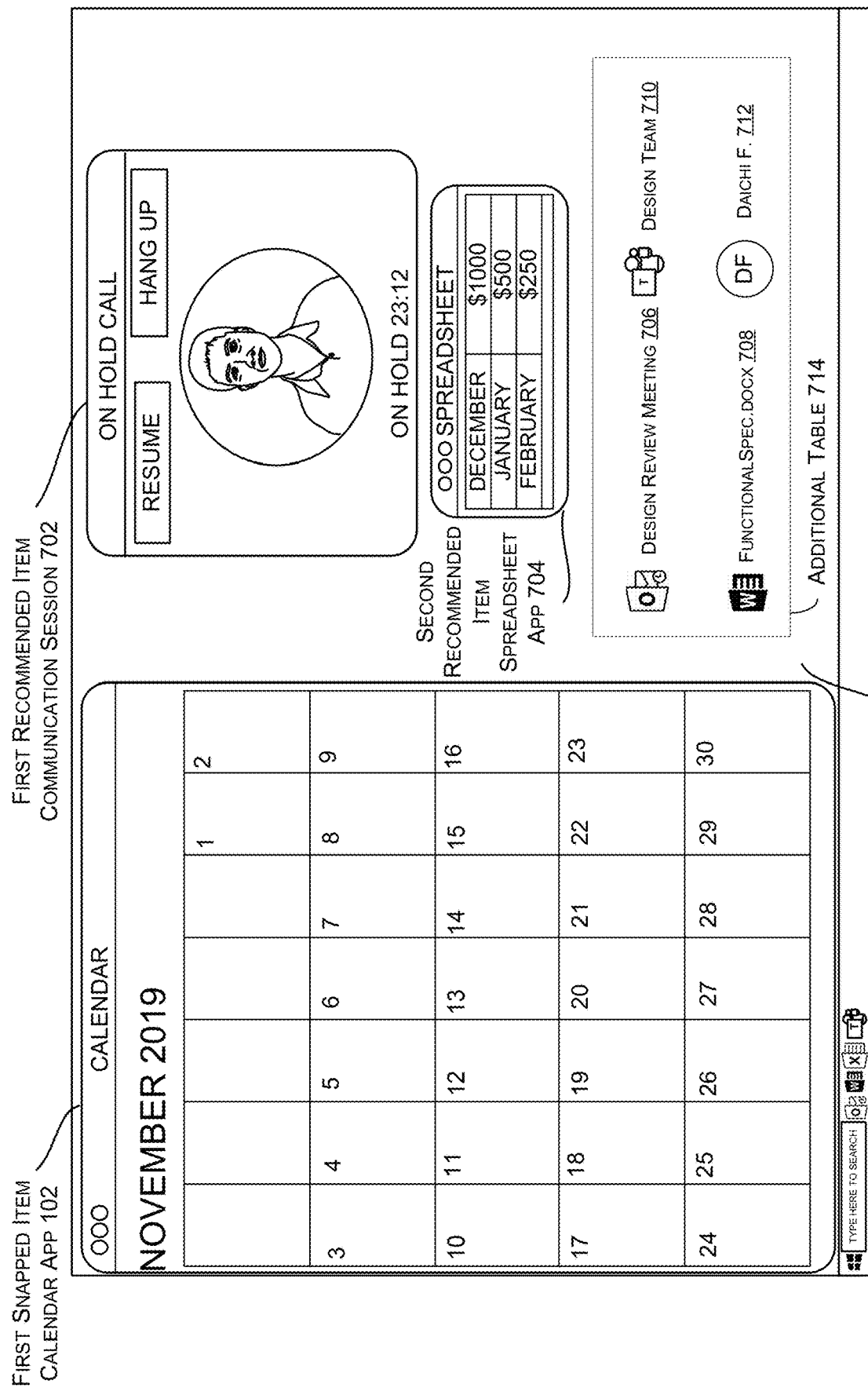
FIG. 7 illustrates an environment with a snap assist multitasking feature utilizing intelligent snap recommendations and a visual hierarchy prominently displaying highly ranked items.

Referring now to FIG. 7, an example display environment 700 is illustrated using one such layout 608 as shown in FIG. 6. As in previous examples, the user has snapped a calendar application 102 on the left side of the display environment 700. In response, the system displays a set of recommended items 702-712 in the right side of the display environment 700. As described with respect to FIG. 6, the recommended items are presented in visual hierarchy that prominently displays highly ranked items to draw the user's attention. In this example, an active communication session 702 has ranked highly among the recommended items. Consequently, the communication session 702 is shown near the top of the display region and in an enlarged format relative to other items such as the spreadsheet application 704. In this way, the user's attention is directed to the communication session 702 and can more quickly snap items to set up their desired workspace.

In addition, the spreadsheet application 704 may be ranked more highly than items 706-712 but below the communication session 702 which translates into a position of moderate prominence in the layout. In a similar manner to the communication session 702, the spreadsheet application 704 is displayed above the items 706-712 and in a moderately sized format in relation to other items of the layout. Finally, the additional items 706-712 are grouped together in an additional table 714. Items may be grouped together in this way to indicate a similar confidence score ranking resulting in the items 706-712 commanding a similar level of attention.

Figure 8:
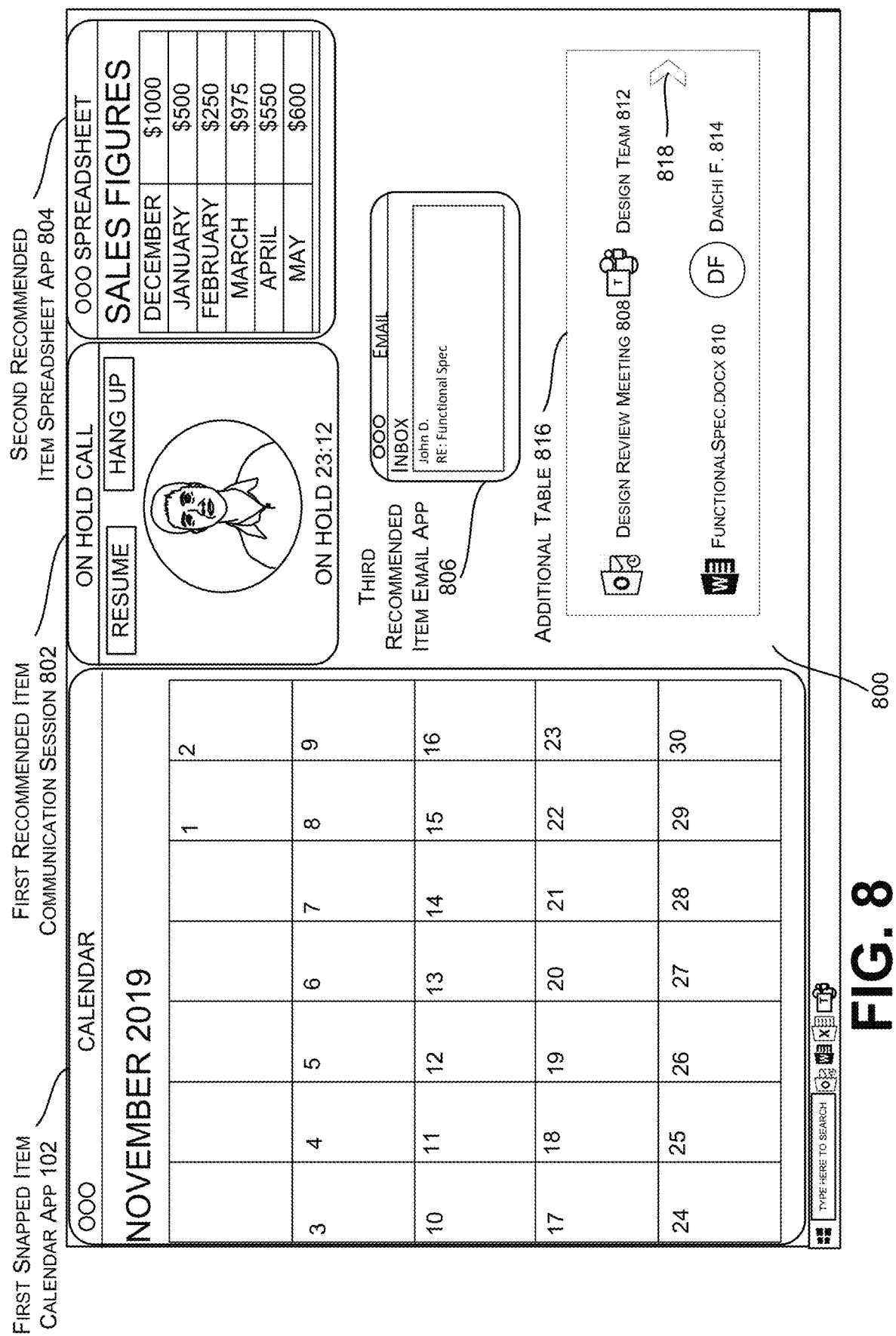
FIG. 8 illustrates additional aspects of the environment with a snap assist multitasking feature utilizing intelligent snap recommendations and a visual hierarchy prominently displaying highly ranked items.

Turning now to FIG. 8, another example layout for presenting intelligent snap assist recommendations is illustrated. As with previous examples, a set of recommended items 802-814 is displayed in response to a user input snapping calendar application 102 on the left side of a display environment 800. Similar to the example of FIG. 7, the recommended items 802-814 are organized into a visual hierarchy based on their respective positions within the ranked list of items. In this instance, an active communication session 802 and a spreadsheet application 804 are highly ranked within the recommended items 216 and are thus prominently displayed at the top of the display in an enlarged format. Furthermore, communication session 802 and spreadsheet application 804 can be displayed alongside each other to indicate a similar confidence score in addition to a high position within the ranked list.

The layout of recommended items can also include a second region displaying an email application 806 which is displayed towards the middle of the snap assist UI and in a moderately sized format. In this way, the system can communicate to the user that the email application 806 may be of some relevance to snapped calendar application 102 but less so as compared to the communication session 802 and spreadsheet application 804. In addition, the layout can also include a third region 816 displaying additional items 808-814 that reach a confidence score threshold for recommendation as shown in FIGS. 3A and 3B. Items of third region can be grouped in the third region 816 to indicate a similar confidence score (e.g., have score differences within a predefined similar score difference). Alternatively, items can be grouped within the third region 816 to clearly communicate to the user that a disparity in associated confidence scores exists between prominent items 802-806 and the grouped items 808-814.

In addition, items can be grouped using criteria other than confidence scores. For example, items in the recommendation layout can be grouped based on various factors such as a level of association with the first item snapped item 102 described above. In a specific example, a user can be involved in a meeting such as design meeting 416 shown in FIG. 4. In this example, the display engine 602 can group items that are relevant to the design meeting 416 such as communication session 802, the functional spec document 810 and design team contact 812. Despite disparities in confidence score, items grouped in this way can be presented prominently in the recommendation layout 608 to draw the user's attention to items relevant to the current task at hand. It should be understood that the examples discussed are merely illustrative and that items can be grouped in the recommendation layout in any other way to intuitively present snap assist recommendations.

The example recommendation layout of FIG. 8 further includes an interactive UI element 818 to indicate that additional recommended items are available to the user. This can include a multi-page layout in which selecting the UI element 818 brings up a new page of recommended items within the third region 816. As discussed above, the display engine 602 can select this particular layout when the list of recommended items 216 is of a certain size. In this example, there may be many lower ranked items having a similar confidence score thereby necessitating a multi-page layout to intuitively present the set of recommended items 216.

Figure 9:
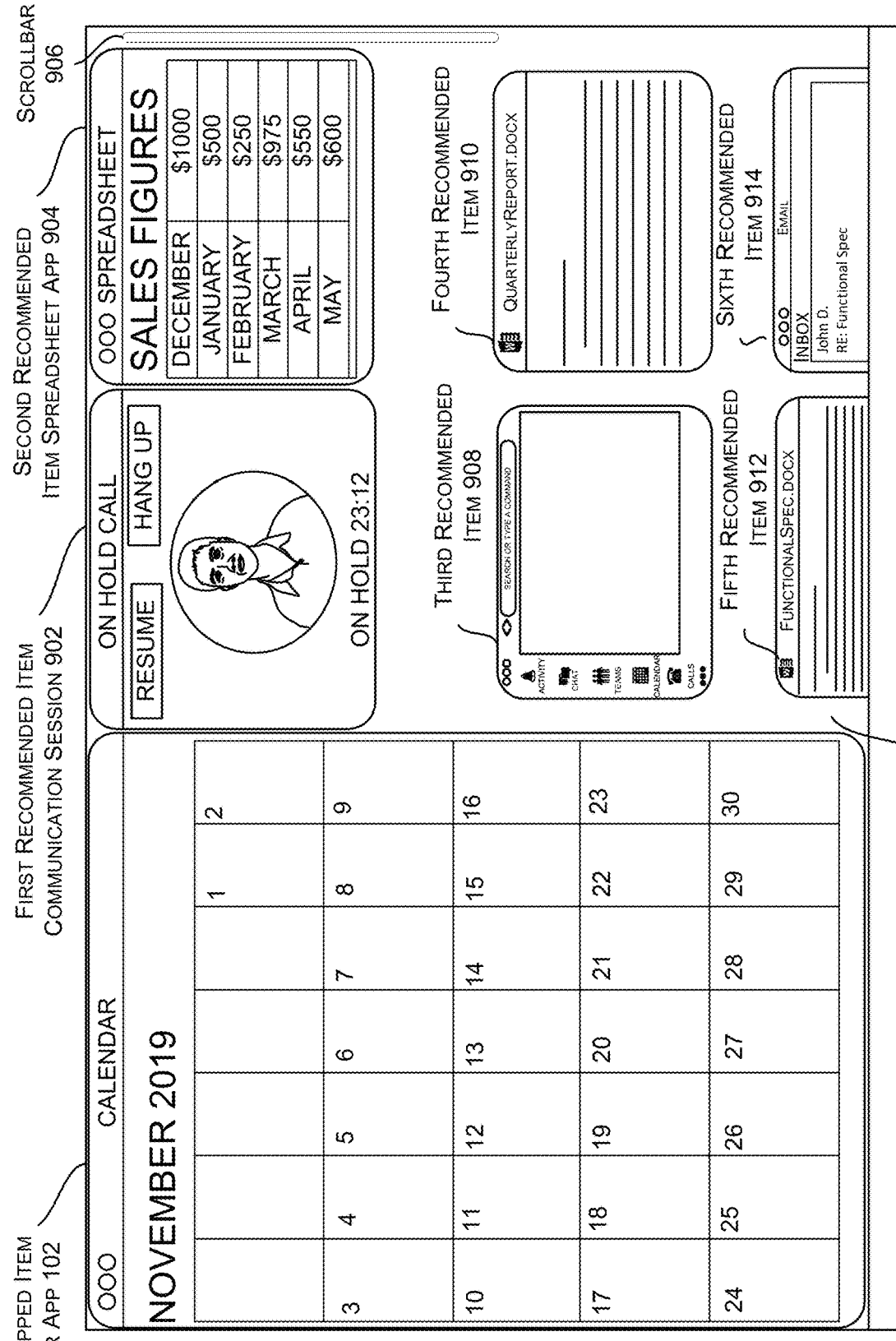
FIG. 9 also illustrates additional aspects of the environment with a snap assist multitasking feature utilizing intelligent snap recommendations and a visual hierarchy prominently displaying highly ranked items.

Turning now to FIG. 9, still another example desktop 900 showing a layout for intuitively displaying intelligent snap assist recommendations is illustrated. Similar to the layout shown in FIG. 8, an active communication session 902 and a spreadsheet application 904 are prominently displayed at the top of the snap assist UI and in an enlarged format due to their high confidence score and associated ranking. However, the list of recommended items 216 for the example layout of FIG. 9 may include many items that have a moderate confidence score which translates to a moderately sized display in the visual hierarchy. To display the recommended items in an intuitive and organized fashion, the display engine 602 can select a scrollable layout having a scroll bar 906 for navigating the list of recommended items. In various examples, prominently displayed items such as the communication session 902 and the item spreadsheet application 904 can be part of a first set of items that have confidence scores that satisfy a threshold. Conversely, items 908-914 can be part of a second set of items with confidence scores that do not satisfy the threshold. Thus, the second set of items can be displayed lower in the visual hierarchy in relation to the first set of items in the snap assist UI.

In this example, a communication application 908, documents 910 and 912, and an email application 914 are shown below the communication session 902 and the spreadsheet application 904 to indicate a lower relative ranking. In addition, several more items may be displayed further below in the scrollable layout format organized by their associated ranking within the list of recommended items. As discussed above, the display engine 602 may select this particular layout based on the size of the list of recommended items 216 and the requirements of the resulting visual hierarchy. In this example, there are many items having a confidence score that translates to a moderately sized format within the visual hierarchy which necessitates the scrollable layout format to present the recommended items in an organized manner.

In each of the examples discussed in FIGS. 7-9, the user can select an item to snap alongside the calendar application 102. As shown in FIG. 6, the system can accordingly detect and store the user's selection for reference when generating future layouts 608. For instance, if the user input selects a prominently displayed item, the system can record the user input as reinforcement of the current user preferences 606. The system can thus continue to generate layouts with minimal adjustments. Conversely, if the user selects a lower ranked item, the system can adjust the user preferences 606 to refine future layouts 608 to tailor layouts to individual users and ensure that prominent items are relevant and useful.

Furthermore, the data defining the user's selection can include various metrics to gauge the user's engagement with a particular recommendation layout. For example, the item selection data 610 can include data defining how long a user took to select an item. In some examples, the user may take a long time to select an item indicating that the user's desired item may not have been easily visible even within the visual hierarchy. The display engine 602 can consider this information to adjust future layouts 608 such as by increasing the overall size of recommended items. The item selection data 610 can additionally include a wide variety of information from the number of pages the user searched through (e.g., the layout of FIG. 8), the distance a user scrolled within the layout (e.g., layout of FIG. 9), to user credentials, and even the time of day. Accordingly, the display engine 602 can use all the information of the item selection data 610 to refine recommendation layouts and quickly help users find desired items to snap.

Figure 10:
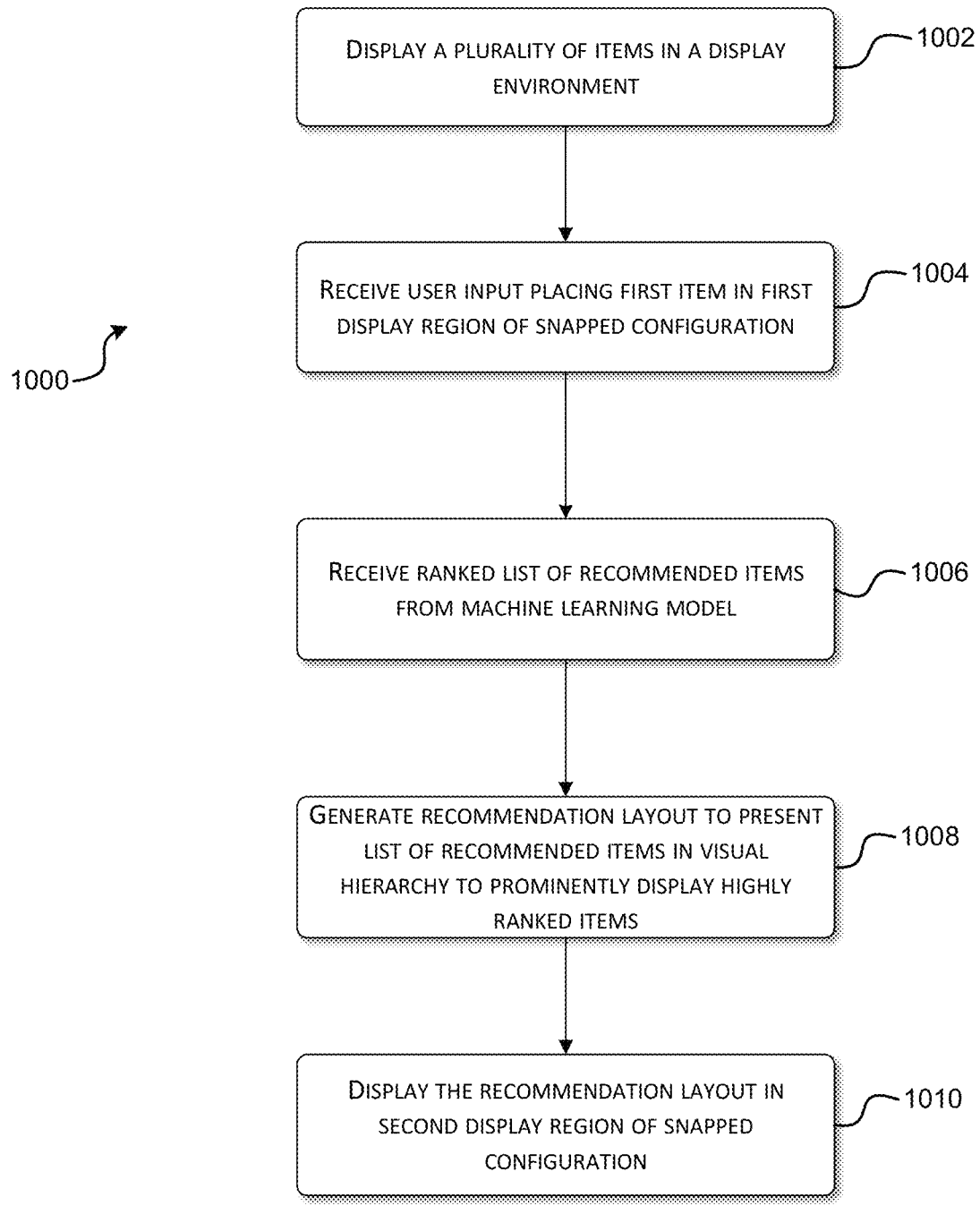
FIG. 10 is a flow diagram showing aspects of a routine for enabling the visual hierarchy shown in FIG. 7.

Turning now to FIG. 10, aspects of a routine 1000 for presenting intelligent snap assist recommendations are shown and described below.

With reference to FIG. 10, routine 1000 begins at operation 1002 where a plurality of items is displayed in a display environment. The display environment can include a desktop provided by personal computing device (e.g., a laptop, a tablet), a large format display such as a in conference room, a smartphone and the like.

At operation 1004, a user provides an input placing a first item in a first display region of a snapped configuration. As described above, the user input can include a gesture dragging the first item to the edge of the display environment. The gesture can be performed using a pointing device such as a mouse and executing a dragging motion to the edge of the display environment. Alternatively, the user input can be performed on a touch sensitive display using a finger or a stylus and similarly performing a dragging motion to the edge of the display environment.

Proceeding to operation 1006, the system receives a list of recommended items generated by a machine learning model (e.g., machine learning model 202). As discussed above, the recommended items are ranked based on associated confidence scores calculated using various factors and factor weights.

Subsequently at operation 1008, the system generates a recommendation layout to intuitively present the ranked list of recommended items. The recommendation layout is organized in a visual hierarchy to prominently display items that are ranked highly within the list of recommended items. Prominence within the recommendation layout can include a position in the display environment, a size of the displayed item and so forth. In this way, the user's attention is drawn to items with high confidence scores.

Finally, at operation 1010, the system presents the list of recommended items to the user in a second region of the snapped configuration using the generated recommendation layout.

Figure 11:
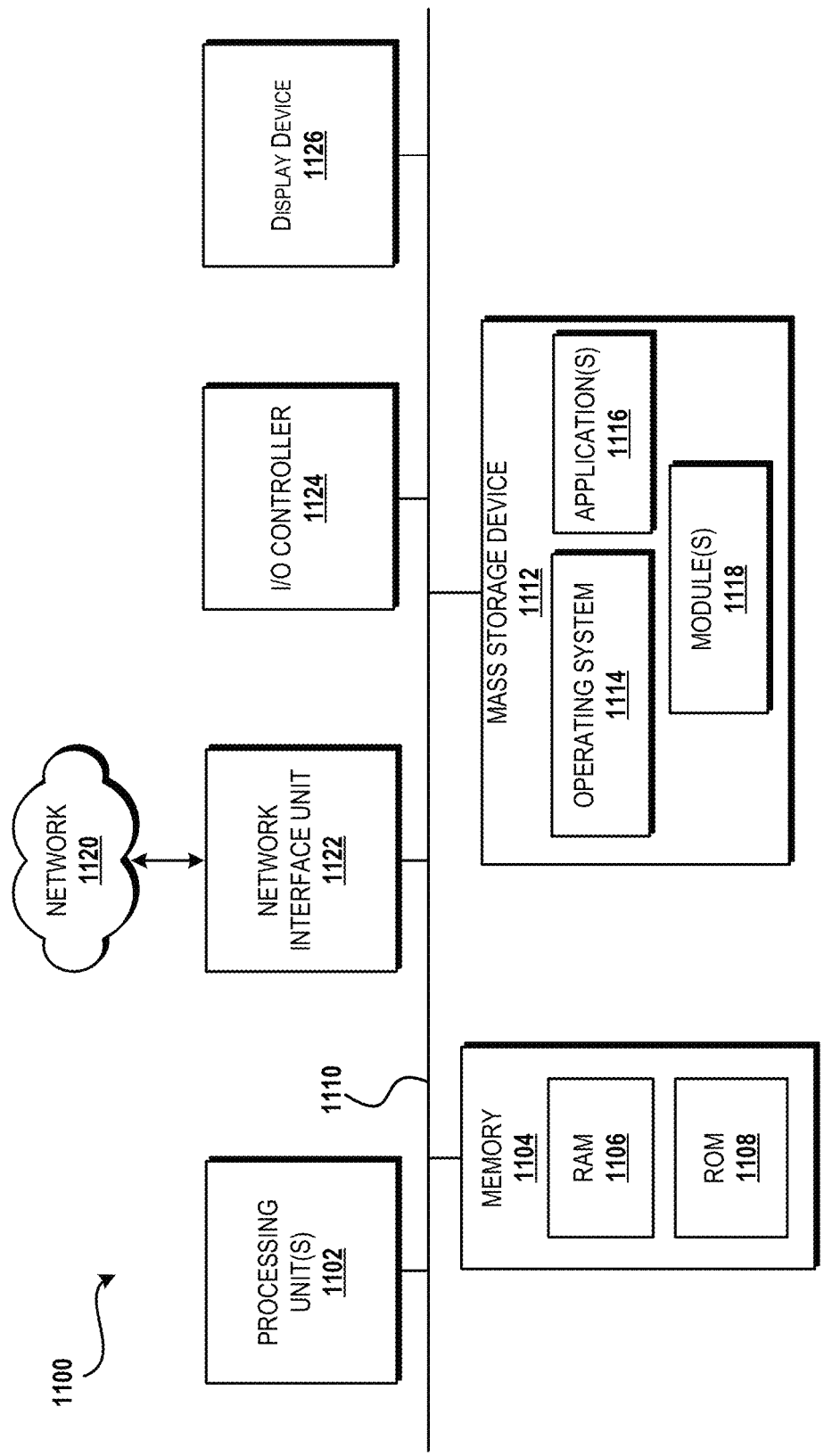
FIG. 11 is a computer architecture diagram illustrating an illustrative computer hardware and software architecture for a computing system capable of implementing aspects of the techniques and technologies presented herein.

FIG. 11 shows additional details of an example computer architecture 1100 for a computer capable of executing the program components described herein. Thus, the computer architecture 1100 illustrated in FIG. 11 illustrates an architecture for a server computer, a mobile phone, a PDA, a smart phone, a desktop computer, a netbook computer, a tablet computer, and/or a laptop computer. The computer architecture 1100 may be utilized to execute any aspects of the software components presented herein.

The computer architecture 1100 illustrated in FIG. 10 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system containing the basic routines that help to transfer information between elements within the computer architecture 1100, such as during startup, is stored in the ROM 1108. The computer architecture 1100 further includes a mass storage device 1112 for storing an operating system 1114, other data, one or more applications 1116, and one or more modules 1118 such as the machine learning model 202 and the display engine 602.

The mass storage device 1112 is connected to the CPU 1102 through a mass storage controller (not shown) connected to the bus 1110. The mass storage device 1112 and its associated computer-readable media provide non-volatile storage for the computer architecture 1100. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 1100. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 1100 may operate in a networked environment using logical connections to remote computers through the network 1120 and/or another network (not shown). The computer architecture 1100 may connect to the network 1120 through a network interface unit 1122 connected to the bus 1110. It should be appreciated that the network interface unit 1122 also may be utilized to connect to other types of networks and remote computer systems. The computer architecture 1100 also may include an input/output controller 1124 for receiving and processing input from a number of other devices, including a keyboard, mouse, or electronic stylus (not shown in FIG. 11). Similarly, the input/output controller 1124 may provide output to a display screen, a printer, or other type of output device (also not shown in FIG. 11).

In various examples, the computer architecture 1100 can include a display device 1126 that is configured to present information in a visual form. In particular, the display device 1126 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display device 1126 is a liquid crystal display ("LCD") utilizing any active or passive matrix technology and any backlighting technology (if used). In some configurations, the display device 1126 is an organic light emitting diode ("OLED") display. Other display types are contemplated. The display device 1126 can also be a touchscreen configured to detect the presence and location of a touch. The display device 1126 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

It should be appreciated that the software components described herein may, when loaded into the processing unit 1102 and executed, transform the processing unit 1102 and the overall computer architecture 1100 from a general-purpose computing system into a special-purpose computing system customized to facilitate the functionality presented herein. The processing unit 1102 may be constructed from any number of transistors or other discrete circuit elements, which may individually or collectively assume any number of states. More specifically, the processing unit 1102 may operate as a finite-state machine, in response to executable instructions contained within the software modules disclosed herein. These computer-executable instructions may transform the processing unit 1102 by specifying how the processing unit 1102 transitions between states, thereby transforming the transistors or other discrete hardware elements constituting the processing unit 1102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1100 in order to store and execute the software components presented herein. It also should be appreciated that the computer architecture 1100 may include other types of computing devices, including hand-held computers, embedded computer systems, personal digital assistants, and other types of computing devices known to those skilled in the art. It is also contemplated that the computer architecture 1100 may not include all of the components shown in FIG. 11, may include other components that are not explicitly shown in FIG. 10, or may utilize an architecture completely different than that shown in FIG. 11.

The disclosure presented herein also encompasses the subject matter set forth in the following clauses.

Example Clause A, a computer-implemented method for providing recommended items for display in a snapped configuration comprising: displaying a first plurality of items in a display environment; receiving a user input placing a first item of the first plurality of items in a first display region of the snapped configuration, wherein the snapped configuration comprises an organized layout in which at least two items are at least one of positioned or resized in the display environment; determining, based on the user input and using a machine learning model, a confidence score for each of the first plurality of items other than the first item based on one or more factors associated with each of the first plurality of items, wherein the one or more factors comprise a frequency of use, a recency of use, an item position in the display environment, and a level of association with the first item; determining, based on the user input and using the machine learning model, a confidence score for each of a second plurality of items that are not currently displayed in the display environment based on the one or more factors; generating a ranked list of the first plurality of items and the second plurality of items based on the confidence scores; determining a set of recommended items, from the ranked list, that have a confidence score that satisfies a threshold; and displaying the set of recommended items in a second region of the snapped configuration.

Example Clause B, the method of Example Clause A, wherein an item comprises at least one of an application, a website, a file, a group of applications, an activity within an application, or an operating system user interface element.

Example Clause C, the method of Example Clause A or Example Clause B, wherein the one or more factors further comprise an item creation date, an item origination location, an item type, and one or more item keywords.

Example Clause D, the method of any one of Example Clauses A through C, wherein one or more weights are applied to the one or more factors to emphasize or deemphasize individual factors.

Example Clause E, the method of Example Clause D, wherein the one or more weights are determined based on historical user data defining past user selections of recommended items across a population of users.

Example Clause F, the method of any one of Example Clauses A through E, wherein the threshold comprises a threshold confidence score, and the set of recommended items comprises items having a confidence score that meets or exceeds the threshold confidence score.

Example Clause G, the method of any one of Example Clauses A through E, wherein the threshold comprises a predefined number of top ranked items, and the set of recommended items is determined by selecting the predefined number of top ranked items from the ranked list.

Example Clause H, the method of any one of Example Clauses A through E, wherein the threshold comprises a threshold confidence score, the method further comprising: determining that a number of items in the set of recommended items that have a confidence score above the threshold confidence score is below a threshold number of items; decreasing the threshold confidence score based on the determination that the number of items in the set of recommended items that have a confidence score above the threshold confidence score is below the threshold number of items; determining that a number of items that have a confidence score above the decreased threshold confidence score is equal to or above the threshold number of items; and generating an alternative set of recommended items based on the number of items that have a confidence score above the decreased threshold confidence score, wherein displaying the set of recommend items includes displaying the alternative set of recommended items in the second display region of the snapped configuration.

Example Clause I, a computing system for providing recommended items for display in a snapped configuration comprising: one or more processing units; and a computer-readable medium having encoded thereon computer-readable instructions to cause the one or more processing units to: display a first plurality of items in a display environment; receive a user input placing a first item of the first plurality of items in a first display region of the snapped configuration, wherein the snapped configuration comprises an organized layout in which at least two items are at least one of positioned or resized in the display environment; determine based on the user input and using a machine learning model, a confidence score for each of the first plurality of items other than the first item based on one or more factors associated with each of the first plurality of items; determine, based on the user input and using the machine learning model, a confidence score for each of a second plurality of items that are not currently displayed in the display environment based on the one or more factors; generate a ranked list of the first plurality of items and the second plurality of items based on the confidence scores; determine a set of recommended items, from the ranked list, that have a confidence score that satisfies a threshold; and display the set of recommended items in a second region of the snapped configuration.

Example Clause J, the system of Example Clause I, wherein an item comprises at least one of an application, a website, a file, a group of applications, an activity within an application, or an operating system user interface element.

Example Clause K, the system of Example Clause I or Example Clause J, wherein the one or more factors comprise a frequency of use, a recency of use, an item position in the display environment, a level of association with the first item, an item creation date, an item origination location, an item type, and one or more item keywords.

Example Clause L, the system of any one of Example Clauses I through K, wherein one or more weights are applied to the one or more factors to emphasize or deemphasize individual factors.

Example Clause M, the system of any one of Example Clauses I through L, wherein the threshold comprises a threshold confidence score, and the set of recommended items comprises items having a confidence score that exceeds the threshold confidence score.

Example Clause N, the system of any one of Example Clauses I through L, wherein the threshold comprises a predefined number of top ranked items, and the set of recommended items is determined by selecting the predefined number of top ranked items from the ranked list Example Clause O, the system of any one of Example Clauses I through L, wherein the threshold comprises a threshold confidence score, the computer-readable medium having instructions that further cause the system to: determine that a number of items in the set of recommended items that have a confidence score above the threshold confidence score is below a threshold number of items; decrease the threshold confidence score based on the determination that the number of items in the set of recommended items that have a confidence score above the threshold confidence score is below the threshold number of items; determine that a number of items that have a confidence score above the decreased threshold confidence score is equal to or above the threshold number of items; and generate an alternative set of recommended items based on the number of items that have a confidence score above the decreased threshold confidence score, wherein displaying the set of recommend items includes displaying the alternative set of recommended items in the second display region of the snapped configuration.

Example Clause P, a computer-readable storage medium having encoded thereon computer-readable instructions to cause a computing system to: display a first plurality of items in a display environment; receive a user input placing a first item of the first plurality of items in a first display region of the snapped configuration, wherein the snapped configuration comprises an organized layout in which at least two items are at least one of positioned or resized in the display environment; determine based on the user input and using a machine learning model, a confidence score for each of the first plurality of items other than the first item based on one or more factors associated with each of the first plurality of items; determine, based on the user input and using the machine learning model, a confidence score for each of a second plurality of items that are not currently displayed in the display environment based on the one or more factors; generate a ranked list of the first plurality of items and the second plurality of items based on the confidence scores; determine a set of recommended items, from the ranked list, that have a confidence score that satisfies a threshold; and display the set of recommended items in a second region of the snapped configuration.

Example Clause Q, the computer-readable storage medium of Example Clause P, wherein an item comprises at least one of an application, a website, a file, a group of applications, an activity within an application, or an operating system user interface element.

Example Clause R, the computer-readable storage medium of Example Clause P or Example Clause Q, wherein the one or more factors comprise a frequency of use, a recency of use, an item position in the display environment, a level of association with the first item, an item creation date, an item origination location, an item type, and one or more item keywords.

Example Clause S, the computer-readable storage medium of any one of Example Clauses P through R, wherein one or more weights are applied to the one or more factors to emphasize or deemphasize individual factors.

Example Clause T, the computer-readable storage medium of any one of Example Clauses P through S, wherein the threshold comprises a threshold confidence score, the computer-readable medium having instructions that further cause the system to: determine that a number of items in the set of recommended items that have a confidence score above the threshold confidence score is below a threshold number of items; decrease the threshold confidence score based on the determination that the number of items in the set of recommended items that have a confidence score above the threshold confidence score is below the threshold number of items; determine that a number of items that have a confidence score above the decreased threshold confidence score is equal to or above the threshold number of items; and generate an alternative set of recommended items based on the number of items that have a confidence score above the decreased threshold confidence score, wherein displaying the set of recommend items includes displaying the alternative set of recommended items in the second display region of the snapped configuration.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different items, two different regions, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for providing recommended items for display in a snapped configuration comprising:
    displaying a plurality of first items in a display environment;
    receiving a snapping user input placing a first item of the plurality of first items in a first display region of the snapped configuration, wherein the snapped configuration comprises an organized layout in which at least two items are at least one of positioned or resized in the display environment;
    determining, based on the snapping user input and using a machine learning model, a first confidence score representing a first relevance to the first item for each other first item of the plurality of first items based on a plurality of first factors wherein the plurality of first factors comprise a frequency with which the first item is used with the other first item, a level of similarity between content associated with the first item and content associated with the other first item, and a first display position of the first item in relation to a second display position of the other first item;
    determining, based on the snapping user input and using the machine learning model, a second confidence score representing a second relevance to the first item for each second item of a plurality of second items, that are not currently displayed in the display environment, based on a plurality of second factors, wherein the plurality of second factors comprise a frequency with which the first item is used with the second item and a level of similarity between content associated with the first item and content associated with the second item;
    generating a ranked list of the plurality of first items and the plurality of second items based on the first confidence scores and the second confidence scores;
    determining a set of recommended items, from the ranked list, that have a first confidence score or a second confidence score that satisfies a threshold; and displaying the set of recommended items in a second display region of the snapped configuration.

2. The method of claim 1, wherein an item comprises at least one of an application, a website, a file, or an operating system user interface element.

3. The method of claim 1, wherein each of the plurality of first factors and the plurality of second factors further comprises an item creation date, an item origination location, an item type, and one or more item keywords.

4. The method of claim 1, wherein weights are applied to each of the plurality of first factors and the plurality of second factors to emphasize or deemphasize individual factors.

5. The method of claim 4, wherein the weights are determined based on historical user data defining past user selections of recommended items across a population of users.

6. The method of claim 1, wherein the threshold comprises a threshold confidence score established to identify a sufficient relevancy between two items, and the set of recommended items comprises items having a first confidence score or a second confidence score that meets or exceeds the threshold confidence score.

7. The method of claim 1, wherein the threshold comprises a predefined number of top ranked items, and the set of recommended items is determined by selecting the predefined number of top ranked items from the ranked list.

8. The method of claim 1, wherein the threshold comprises a threshold confidence score, the method further comprising:
    determining that a number of items in the set of recommended items that have a first confidence score or a second confidence score above the threshold confidence score is below a threshold number of items;
    decreasing the threshold confidence score based on the determination that the number of items in the set of recommended items that have a first confidence score or a second confidence score above the threshold confidence score is below the threshold number of items;
    determining that a number of items that have a first confidence score or a second confidence score above the decreased threshold confidence score is equal to or above the threshold number of items; and
    generating an alternative set of recommended items based on the number of items that have a first confidence score or a second confidence score above the decreased threshold confidence score, wherein displaying the set of recommended items includes displaying the alternative set of recommended items in the second display region of the snapped configuration.

9. The computer-implemented method of claim 1, wherein the first item of the plurality of first items is maximized within the first display region of the organized layout of the snapped configuration.

10. A computing system for providing recommended items for display in a snapped configuration comprising:
    one or more processing units; and
    a computer-readable medium having encoded thereon computer-readable instructions to cause the one or more processing units to:
    display a plurality of first items in a display environment;
    receive a snapping user input placing a first item of the plurality of first items in a first display region of the snapped configuration, wherein the snapped configuration comprises an organized layout in which at least two items are at least one of positioned or resized in the display environment;
    determine, based on the snapping user input and using a machine learning model, a first confidence score representing a first relevance to the first item for each other first item of the plurality of first items based on a plurality of first factors, wherein the plurality of first factors comprise a frequency with which the first item is used with the other first item, a level of similarity between content associated with the first item and content associated with the other first item, and a first display position of the first item in relation to a second display position of the other first item;

determine, based on the snapping user input and using the machine learning model, a second confidence score representing a second relevance to the first item for each second item of a plurality of second items, that are not currently displayed in the display environment, based on a plurality of second factors, wherein the plurality of second factors comprise a frequency with which the first item is used with the second item and a level of similarity between content associated with the first item and content associated with the second item;

generate a ranked list of the plurality of first items and the plurality of second items based on the first confidence scores and the second confidence scores;

determine a set of recommended items, from the ranked list, that have a first confidence score or a second confidence score that satisfies a threshold; and display the set of recommended items in a second display region of the snapped configuration.

11. The system of claim 10, wherein an item comprises at least one of an application, a website, a file, or an operating system user interface element.

12. The system of claim 10, wherein each of the plurality of first factors and the plurality of second factors comprises an item creation date, an item origination location, an item type, and one or more item keywords.

13. The system of claim 10, wherein weights are applied to each of the plurality of first factors and the plurality of second factors to emphasize or deemphasize individual factors.

14. The system of claim 10, wherein the threshold comprises a threshold confidence score established to identify a sufficient relevancy between two items, and the set of recommended items comprises items having a first confidence score or a second confidence score that exceeds the threshold confidence score.

15. The system of claim 10, wherein the threshold comprises a predefined number of top ranked items, and the set of recommended items is determined by selecting the predefined number of top ranked items from the ranked list.

16. The system of claim 10, wherein the threshold comprises a threshold confidence score, the computer-readable medium having instructions that further cause the system to:

determine that a number of items in the set of recommended items that have a first confidence score or a second confidence score above the threshold confidence score is below a threshold number of items;

decrease the threshold confidence score based on the determination that the number of items in the set of recommended items that have a first confidence score or a second confidence score above the threshold confidence score is below the threshold number of items;

determine that a number of items that have a first confidence score or a second confidence score above the decreased threshold confidence score is equal to or above the threshold number of items; and generate an alternative set of recommended items based on the number of items that have a first confidence score or a second confidence score above the decreased threshold confidence score, wherein displaying the set of recommended items includes displaying the alternative set of recommended items in the second display region of the snapped configuration.

17. A computer-readable storage medium having encoded thereon computer-readable instructions to cause a computing system to:

display a plurality of first items in a display environment;

receive a snapping user input placing a first item of the plurality of first items in a first display region of the snapped configuration, wherein the snapped configuration comprises an organized layout in which at least two items are at least one of positioned or resized in the display environment;

determine, based on the snapping user input and using a machine learning model, a first confidence score representing a first relevance to the first item for each other first item of the plurality of first items based on a plurality of first factors, wherein the plurality of first factors comprise a frequency with which the first item is used with the other first item, a level of similarity between content associated with the first item and content associated with the other first item, and a first display position of the first item in relation to a second display position of the other first item;

determine, based on the snapping user input and using the machine learning model, a second confidence score representing a second relevance to the first item for each second item of plurality of second items, that are not currently displayed in the display environment, based on a plurality of second factors, wherein the plurality of second factors comprise a frequency with which the first item is used with the second item and a level of similarity between content associated with the first item and content associated with the second item;

generate a ranked list of the plurality of first items and the plurality of second items based on the first confidence scores and the second confidence scores; determine a set of recommended items, from the ranked list, that have a first confidence score or a second confidence score that satisfies a threshold; and display the set of recommended items in a second display region of the snapped configuration.

18. The computer-readable storage medium of claim 17, wherein an item comprises at least one of an application, a website, or an operating system user interface element.

19. The computer-readable storage medium of claim 17, wherein each of the plurality of first factors and the plurality of second factors comprises an item creation date, an item origination location, an item type, and one or more item keywords.

20. The computer-readable storage medium of claim 17, wherein the threshold comprises a threshold confidence score, the computer-readable medium having instructions that further cause the system to:

determine that a number of items in the set of recommended items that have a first confidence score or a second confidence score above the threshold confidence score is below a threshold number of items;

decrease the threshold confidence score based on the determination that the number of items in the set of recommended items that have a first confidence score or a second confidence score above the threshold confidence score is below the threshold number of items;

determine that a number of items that have a first confidence score or a second confidence score above the decreased threshold confidence score is equal to or above the threshold number of items; and generate an alternative set of recommended items based on the number of items that have a first confidence score or a second confidence score above the decreased threshold confidence score, wherein displaying the set of recommended items includes displaying the alternative set of recommended items in the second display region of the snapped configuration.

* * * * *